US010567803B2

(12) United States Patent
Jacobson et al.

(10) Patent No.: US 10,567,803 B2
(45) Date of Patent: Feb. 18, 2020

(54) MIDPOINT PREDICTION ERROR DIFFUSION FOR DISPLAY STREAM COMPRESSION

(71) Applicant: QUALCOMM Incorporated, San Diego, CA (US)

(72) Inventors: Natan Haim Jacobson, San Diego, CA (US); Ike Ikizyan, San Diego, CA (US); Vijayaraghavan Thirumalai, Fremont, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 15/950,504

(22) Filed: Apr. 11, 2018

(65) Prior Publication Data

US 2018/0302651 A1 Oct. 18, 2018

Related U.S. Application Data

(60) Provisional application No. 62/484,847, filed on Apr. 12, 2017.

(51) Int. Cl.
| | |
|---|---|
| *H04N 19/65* | (2014.01) |
| *H04N 19/176* | (2014.01) |
| *H04N 19/91* | (2014.01) |
| *H04N 19/46* | (2014.01) |
| *H04N 19/124* | (2014.01) |

(Continued)

(52) U.S. Cl.
CPC ........... *H04N 19/65* (2014.11); *H04N 19/124* (2014.11); *H04N 19/136* (2014.11); *H04N 19/176* (2014.11); *H04N 19/182* (2014.11); *H04N 19/46* (2014.11); *H04N 19/53* (2014.11);
(Continued)

(58) Field of Classification Search
CPC combination set(s) only.
See application file for complete search history.

(56) References Cited

U.S. PATENT DOCUMENTS

| 2005/0053287 A1 | 3/2005 | So et al. | |
|---|---|---|---|
| 2014/0294089 A1* | 10/2014 | MacInnis | ............... H04N 19/63 375/240.19 |

(Continued)

FOREIGN PATENT DOCUMENTS

EP 3104608 A1 12/2016

OTHER PUBLICATIONS

International Search Report and Written Opinion—PCT/US2018/027352—ISA/EPO—dated Jun. 20, 2018, 16 pp.

(Continued)

*Primary Examiner* — Janese Duley
(74) *Attorney, Agent, or Firm* — Shumaker & Sieffert, P.A.

(57) ABSTRACT

A method of content compression including receiving a first block of samples including at least a first sample and a second sample, calculating a predictor value for the first block of samples, calculating a residual between the predictor value and the first sample, quantizing the residual to generate a quantized residual, de-quantizing the quantized residual to generate a de-quantized residual, reconstructing the first sample using the de-quantized residual and the predictor value to generate a first reconstructed sample, calculating an error value based on the first sample and the first reconstructed sample, and modifying the second sample by the error value.

38 Claims, 11 Drawing Sheets

(51) Int. Cl.
*H04N 19/98* (2014.01)
*H04N 19/53* (2014.01)
*H04N 19/136* (2014.01)
*H04N 19/182* (2014.01)
*H04N 19/82* (2014.01)

(52) U.S. Cl.
CPC ............. *H04N 19/82* (2014.11); *H04N 19/91* (2014.11); *H04N 19/98* (2014.11)

(56) References Cited

U.S. PATENT DOCUMENTS

| | | |
|---|---|---|
| 2016/0301950 A1 | 10/2016 | Jacobson et al. |
| 2017/0085886 A1 | 3/2017 | Jacobson et al. |
| 2017/0302932 A1 | 10/2017 | Jacobson et al. |

OTHER PUBLICATIONS

Lai Y-H., et al., "Error Diffused Intra Prediction for HEVC," 2015 IEEE International Conference on Acoustics, Speech and Signal Processing (ICASSP), IEEE, Apr. 19, 2015 (Apr. 19, 2015), pp. 1424-1427, XP033186949, DOI: 10.1109/ICASSP.2015.7178205 [retrieved on Aug. 4, 2015].

Ting M.Y., et al., "Error-Diffused Image Compression Using a Halftone-to-Gray-Scale Decoder and Predictive Pruned Tree-Structured Vector Quantization," SID International Symposium—Digest of Technical Papers, Applications Session, Seattle, WA, May 16-21, 1993; [SID International Symposium—Digest of Technical Papers], Playa Del Rey, SID, US, vol. 24, No. 1, May 16, 1993 (May 16, 1993), pp. 227-230, XP000645211.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Walls F., et al., "VESA Display Stream Compression", Video Electronics Standards Association (VESA), Mar. 3, 2014 (Mar. 3, 2014), pp. 1-5, XP002751573, Retrieved from the Internet: URL: http://www.vesa.org/wp-content/uploads/2014/04/VESA_DSC-ETP200.pdf on-Nov. 27, 2015].

Floyd R.W., et al., "An Adaptive Algorithm for Spatial Greyscale", Proceedings of the Society of Information Display, vol. 17, No. 2, First Quarter, 1976, pp. 75-77.

VESA, Video Electronics Standards Association, "VESA Display Stream Compression (DSC) Standard", Version 1.1, Aug. 1, 2014, 125 pp.

\* cited by examiner

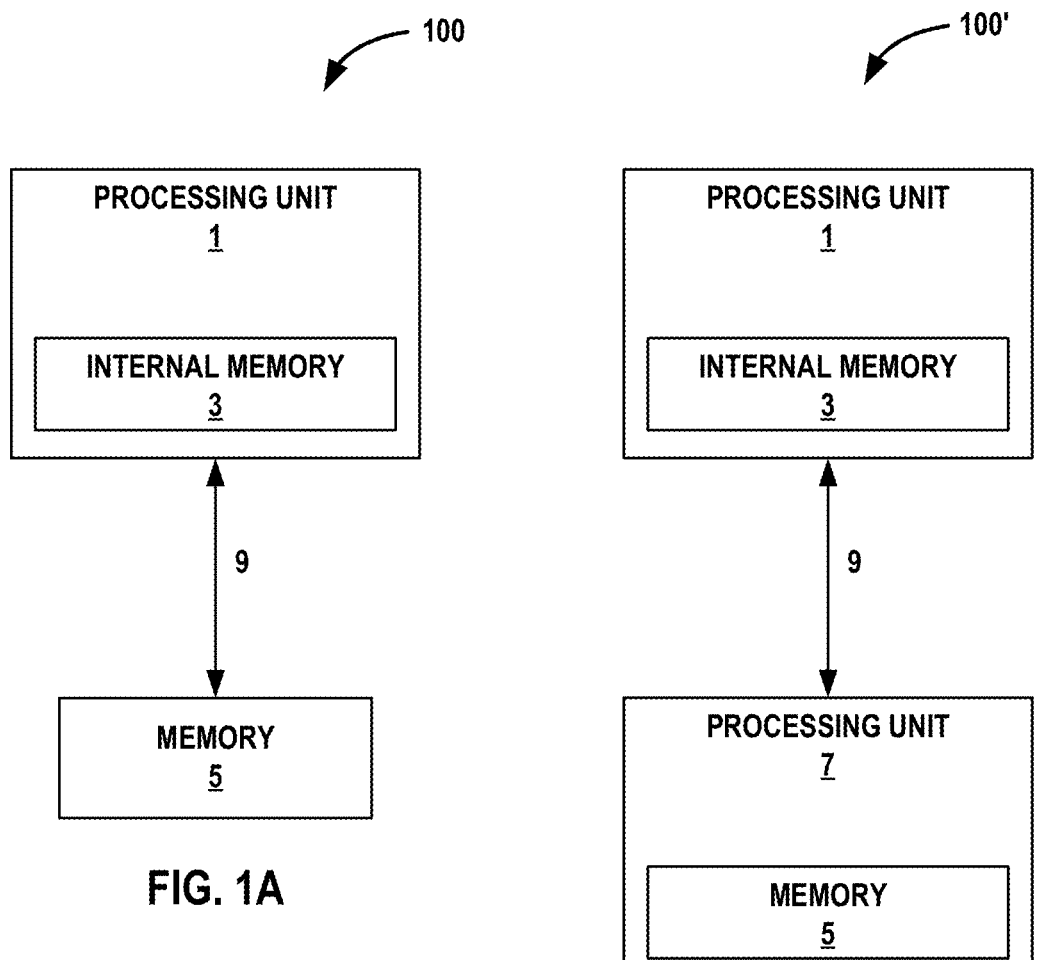
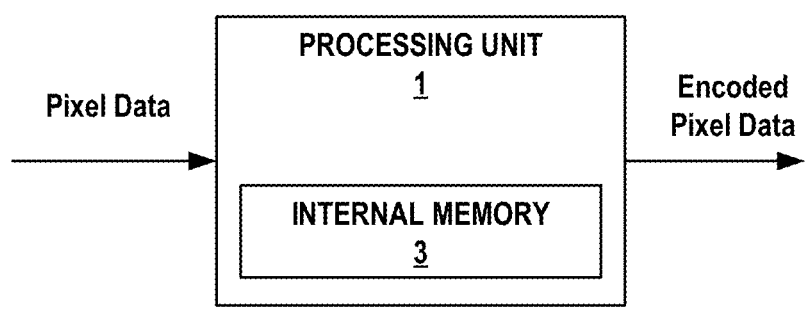

MIDPOINT PREDICTION ERROR DIFFUSION FOR DISPLAY STREAM COMPRESSION

This application claims the benefit of U.S. Provisional Application No. 62/484,847, filed Apr. 12, 2017, the entire content of which is incorporated by reference herein.

TECHNICAL FIELD

This disclosure relates to error diffusion in video encoding.

BACKGROUND

Digital content capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Links, such as display links, may be used to transfer content from a source (e.g., a memory storing image and/or video data) to a display. For example, a display link may connect a set-top box to a television or a computer to a display.

The bandwidth requirements of display links are typically proportional to the resolutions of the displays, and thus, high-resolution displays benefit from large bandwidth display links. Some display links do not have the bandwidth to support high resolution displays. Video compression can be used to reduce the bandwidth requirements such that lower bandwidth display links can be used to provide digital video to higher resolution displays. Image compression on the pixel data may be used. However, such schemes are sometimes not visually lossless or can be difficult and expensive to implement in conventional display devices.

The Video Electronics Standards Association (VESA) has developed Display Stream Compression (DSC) as a standard for display link video compression. A display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

In general, this disclosure describes techniques for coding content, including the encoding and decoding of video data. The techniques of this disclosure may be used with any video compression techniques, whether or not in accordance with a content coding standards such as DSC, VESA Display Compression-M (VDC-M) or other content coding standards. For example, this disclosure describes techniques for the coding of content (e.g., video data) for transmission, such as transmission over a link (e.g., a display link). As another example, this disclosure describes techniques that may be used to increase the compression ratio (e.g., from 3:1 to 4:1 as one example) of content in accordance with a fixed rate visually lossless content coding standard, such as DSC or VDC-M.

In other examples, this disclosure describes techniques that introduce error diffusion in a fixed rate compression codec, such as for next generation DSC, VDC-M, or other video codecs. The introduction of error diffusion may improve the representation of random noise under compression. For example, introduction of error diffusion may visually soften noise in an image, such as when error diffusion is applied to regions of an image that have high or maximum entropy. In some examples, the introduction of error diffusion may improve the representation of random noise under compression (e.g., under heavy compression). Other possible example benefits are described throughout this disclosure.

In one example, this disclosure describes a method of content compression, the method comprising receiving a first block of samples including at least a first sample and a second sample, calculating a predictor value for the first block of samples, calculating a residual between the predictor value and the first sample, quantizing the residual to generate a quantized residual, de-quantizing the quantized residual to generate a de-quantized residual, reconstructing the first sample using the de-quantized residual and the predictor value to generate a first reconstructed sample, calculating an error value based on the first sample and the first reconstructed sample, and modifying the second sample by the error value.

In another example, this disclosure describes a device comprising a memory configured to store content and one or more processors in communication with the memory, wherein the one or more processors are configured to receive a first block of samples including at least a first sample and a second sample, calculate a predictor value for the first block of samples, calculate a residual between the predictor value and the first sample, quantize the residual to generate a quantized residual, de-quantize the quantized residual to generate a de-quantized residual, reconstruct the first sample using the de-quantized residual and the predictor value to generate a first reconstructed sample, calculate an error value based on the first sample and the first reconstructed sample, and modify the second sample by the error value.

In another example, this disclosure describes an apparatus comprising means for receiving a first block of samples including at least a first sample and a second sample, means for calculating a predictor value for the first block of samples, means for calculating a residual between the predictor value and the first sample, means for quantizing the residual to generate a quantized residual, means for de-quantizing the quantized residual to generate a de-quantized residual, means for reconstructing the first sample using the de-quantized residual and the predictor value to generate a first reconstructed sample, means for calculating an error value based on the first sample and the first reconstructed sample, and means for modifying the second sample by the error value.

In another example, this disclosure describes a computer-readable storage medium storing instructions that, when executed, cause one or more processors to receive a first block of samples including at least a first sample and a second sample, calculate a predictor value for the first block of samples, calculate a residual between the predictor value and the first sample, quantize the residual to generate a quantized residual, de-quantize the quantized residual to generate a de-quantized residual, reconstruct the first sample using the de-quantized residual and the predictor value to generate a first reconstructed sample, calculate an error value based on the first sample and the first reconstructed sample, and modify the second sample by the error value.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 1A-C illustrate example processing units configured to implement one or more techniques of this disclosure.

DETAILED DESCRIPTION

Figure 2:
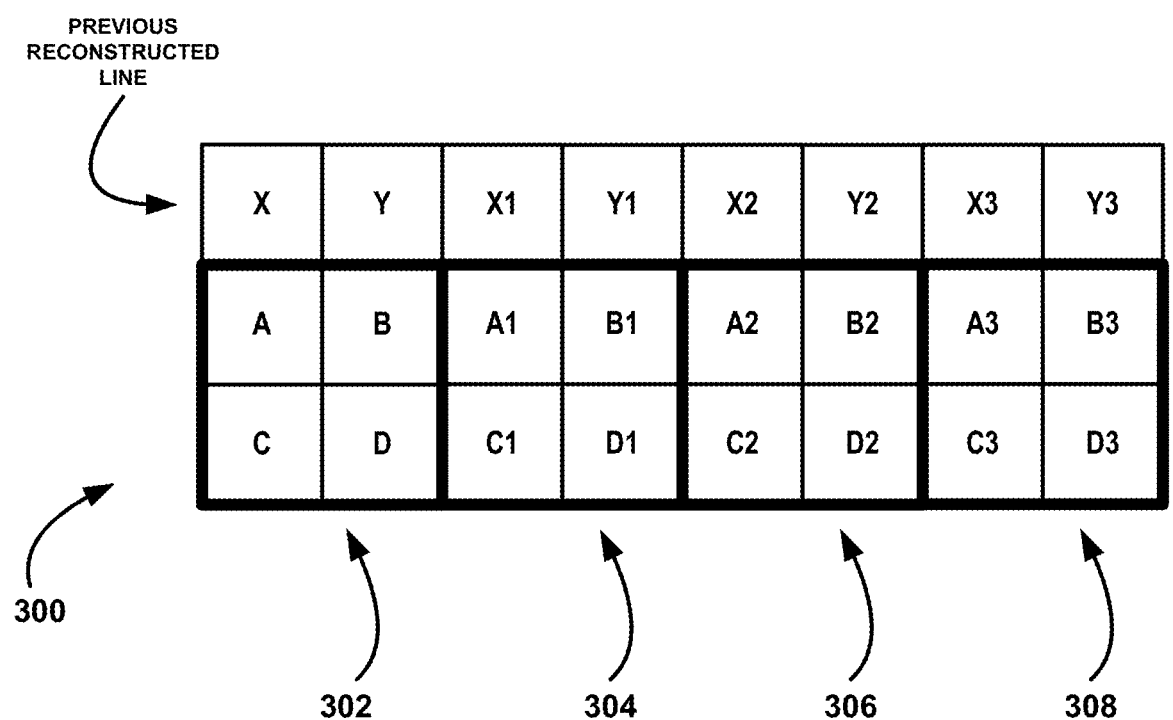
FIG. 2 illustrates an example coding block in accordance with the techniques of this disclosure.

In general, this disclosure describes techniques for coding content, including the encoding and decoding of video data. The techniques of this disclosure may be used with any video compression techniques, whether or not in accordance with a content coding standard such as DSC, VESA Display Compression-M (VDC-M) or other content coding standards. For example, this disclosure describes techniques for the coding of content (e.g., video data) for transmission, such as transmission over a link (e.g., a display link). As another example, this disclosure describes techniques that may be used to increase the compression ratio (e.g., from 3:1 to 4:1 as one example) of content in accordance with a fixed rate visually lossless content coding standard, such as DSC or VDC-M.

In other examples, this disclosure describes techniques that introduce error diffusion in a fixed rate compression codec, such as for next generation DSC, VDC-M, or other video codecs. The introduction of error diffusion may improve the representation of random noise under compression. For example, introduction of error diffusion may visually soften noise in an image, such as when error diffusion is applied to regions of an image that have high or maximum entropy. In some examples, the introduction of error diffusion may improve the representation of random noise under compression (e.g., under heavy compression). Other possible example benefits are described throughout this disclosure.

An example of display stream compression techniques includes the 3:1 compression ratio display stream compression (DSC) v1.0 solution recently finalized by the Video Electronics Standards Association (VESA). DSC 1.0 may be insufficient to drive future market requirements (e.g., mobile market requirements), especially for high resolution displays such as 4K. Therefore, to address future demands, VESA released a CfT (call for technology) in order to develop a next-generation DSC solution that targets compression ratios of 4:1 and higher. In response to the CfT, Qualcomm has developed a content coder and a test model (which was originally called advanced display stream compression (ADSC), but is now referred to as VDC-M). The content coder may be configured to provide low cost, fixed-rate visually lossless compression. The test model may refer to compression protocols, algorithms, standards, or the like that content coder may be configured to code data in accordance therewith.

In examples of this disclosure, a DSC coder may be designed based on a block-based approach (with block size P×Q) and may be configured to code content (e.g., video data) using a plurality of coding modes. Example coding modes for blocks of video data may include a transform mode (e.g., DCT, Hadamard), a block prediction mode, a differential pulse code modulation (DPCM) mode, a pattern mode, a mid-point prediction (MPP) mode, and a mid-point predication fall back (MPPF) mode. Several coding modes may be used in the coder in order to effectively compress different types of contents or images. For example, text images can be effectively compressed by a pattern mode (e.g., block prediction), while natural images can be effectively compressed by transform mode.

Among these modes, MPP is present in the content coder developed by Qualcomm. In some examples, MPP mode may predict each sample in the current block from a midpoint value, which may be referred to as a midpoint predictor value or midpoint predictor. A residual (e.g., the difference between a sample and a sample predicted using the midpoint predictor) may first be quantized using a quantizer (e.g., a uniform scalar quantizer (USQ)), and then encoded using a fixed number of bits per sample. In some examples, this mode may be used extensively in the presence of random noise, which cannot be predicted efficiently using transform or block prediction modes, since there is no spatial correlation to be used.

In some examples, the content coder may be configured to select a coding mode for each block from the plurality of coding modes based on rate-control mechanism which aims to select the best mode for each block by considering both the rate and the distortion of the mode. The rate-control mechanism is supported by a buffer model, and it is the design requirement of the codec that the buffer is never in a state of underflow (fewer than zero bits in the buffer) or overflow (buffer size has increased past a set maximum size).

Midpoint prediction fallback (MPPF) mode is a variant of MPP mode with a fixed step size, such that the MPPF mode rate is strictly less than the average block rate of the encoder. Any discussion in this disclosure related to MPP mode may be naturally extended to MPPF using the same techniques. Random-noise images are typically coded using MPP and MPPF modes. Therefore, diffusing errors in these modes using the techniques of this disclosure may improve the visual quality of content encoded using these modes.

In some examples, error diffusion may be used to keep track of the quantization error of each sample in an image, and diffuse this error to neighboring samples, such that accumulated error is minimized. In some examples, error diffusion may be abbreviated as "ED."

As used herein, instances of the term "content" may refer to the term "video" or "image" and vice versa. This is true regardless of whether the terms "content" or "video" are being used as an adjective, noun, or other part of speech. For example, reference to a "content coder" may include reference to a "video coder" or an "image coder," and reference to a "video coder" or an "image coder" may include reference to a "content coder." Similarly, reference to "content" also includes reference to "video" or "image," and reference to "video" or "image" may include reference to "content."

As used herein, "content" refers to any type of content. For example, "content" may refer to video content, screen content, image content, any graphical content, or any displayable content. As another example, "content" may refer to pixel data corresponding to video content, screen content, image content, any graphical content, or any displayable content. For example, an image includes a plurality of pixels, with each pixel having one or more components depending on the color space. It is therefore understood that reference to "pixel data" may include reference to pixel data of any content.

As used herein, "pixel data" may refer to one or more pixels. The one or more pixels may include one or more component values. For example, a pixel in the RGB color space may include three color components: a red color component value, a green color component value, and a blue color component value. In some examples, a "sample" may refer to a "pixel." In other examples, a "sample" may refer to a component of a pixel. For example, a pixel in the RGB color space may include three samples: a red sample, a green sample, and a blue sample. The red sample may be the red color component value, the green sample may be the green color component value, and the blue sample may be the blue color component value for the pixel. It is thus understood that reference to performing an operation on a sample may refer to performing an operation on a component (e.g., color component) of a pixel.

As used herein, the term "video" may refer to a plurality of images that may be presented in a sequence. As used herein, the term "image" may refer to a single image (e.g., a picture), one or more images, one or more images amongst a plurality of images corresponding to a video, one or more images amongst a plurality of images not corresponding to a video, a plurality of images corresponding to a video (e.g., all of the images corresponding to the video or less than all of the images corresponding to the video), a sub-part (e.g., a sub-block) of a single image, a plurality of sub-parts (e.g., sub-blocks) of a single image, a plurality of sub-parts (e.g., sub-blocks) corresponding to a plurality of images, image data, graphical data, or the like. In some examples, the term "picture" may be interchangeable with "image."

As used herein, the terms "encode" and "compress" may be used interchangeably. Similarly, the terms "decode" and "decompress" may be used interchangeably.

As used herein, the terms "link" or "display link" may refer to a wired or wireless link. In some examples, the terms "link" and "display link" may be interchangeable. In other examples, the terms "link" and "display link" may not be interchangeable. In some examples a display link may refer to a communication link over which content must comply with a display protocol (which may also be referred to as a display link protocol). Some examples of display protocols include HDMI protocol, DisplayPort protocol, MIPI DSI protocol, or another communication protocol.

FIG. 1A is a block diagram illustrating an example content coding system 100. Content coding system 100 may include processing unit 1 that may be configured to implement one or more techniques of this disclosure. As shown in FIG. 1A, processing unit 1 may include internal memory 3. Memory external to processing unit 1, such as depicted memory 5, may be accessible to processing unit 1. For example, processing unit 1 may be communicatively coupled to memory 5 over a bus. In some examples, processing unit 1 may be directly communicatively coupled to memory 5 via a communication medium such as bus 9. In other examples, processing unit 1 may be indirectly communicatively coupled to memory 5 via a communication medium such as a bus. For example, processing unit 1 may be communicatively directly coupled to another component (e.g., a different processing unit) which is directly communicatively coupled to memory 5 via a communication medium such as a bus.

In some examples, memory 5 may be system memory, such as a system memory of a computing device in which processing unit 1 may be implemented. In other examples, memory 5 may be memory internal to another processing unit or computing device, such as in the example content coding system 100' shown in FIG. 1B. In the example content coding system 100' shown FIG. 1B, processing unit 7 may be a processing unit different from processing unit 1. Processing unit 1 described herein may be configured to perform one or more techniques described herein.

In some examples, processing unit 1 may be a display processing unit. In the example of FIG. 1B, processing unit 7 may, in some examples, be a central processing unit (CPU), a graphics processing unit (GPU), a video coder, a digital signal processing unit (DSP), or any other processing unit different from processing unit 1 (e.g., any other content producing processing unit).

In either of the examples of FIGS. 1A and 1B, processing unit 1 may be configured to receive content from any source, such as memory 5. Memory 5 may be configured to store content. The content may be any content, such as pre-captured content, content captured in real-time (e.g., memory 5 may be a real-time buffer), computer-generated content, or any other content. Processing unit 1 may be configured to receive content (e.g., from memory 5) in the form of pixel data. Otherwise described, processing unit 1 may be configured to receive pixel data of content. For example, processing unit 1 may be configured to receive a value for each component (e.g., each color component) of one or more pixels of content. A pixel in the RGB color space may include a first value for the red component, a second value for the green component, and a third value for the blue component.

Internal memory 3 and/or memory 5 may include one or more volatile or non-volatile memories or storage devices. In some examples, internal memory 3 and/or memory 5 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

Internal memory 3 and/or memory 5 may be a non-transitory storage medium according to some examples. The term "non-transitory" may indicate that the storage medium is not embodied in a carrier wave or a propagated signal. However, the term "non-transitory" should not be interpreted to mean that internal memory 3 and/or memory 5 is non-movable or that its contents are static. As one example, memory 5 may be removed from computing device 2, and moved to another device. As another example, memory 5 may not be removable from computing device 2.

In some examples, processing unit 1 be integrated into a motherboard of a computing device. In some examples, processing unit 1 may be may be present on a graphics card that is installed in a port in a motherboard of a computing device or may be otherwise incorporated within a peripheral device configured to interoperate with a computing device. In some examples, processing unit 1 may be a processing module on a system on chip (SOC). Processing unit 1 may include one or more processors, such as one or more microprocessors, application specific integrated circuits (ASICs), field programmable gate arrays (FPGAs), fixed-function circuits, programmable processors, arithmetic logic units (ALUs), digital signal processors (DSPs), discrete logic, software, hardware, firmware, other equivalent integrated or discrete logic circuitry, or any combinations thereof. If the techniques are implemented partially in software, a processing unit 1 may store instructions for the software in a suitable, non-transitory computer-readable storage medium (e.g., internal memory 3), and may execute the instructions in hardware using one or more processors to perform the techniques of this disclosure. Any of the foregoing (including hardware, software, a combination of hardware and software, etc.) may be considered to be one or more processors. The term "processor" may be interchangeable with "processing unit."

Processing unit 1 may include one or more processor cores, so that processing unit 1 may be referred to as a multi-core processor. In some examples, processing unit 1 may be specialized hardware that includes integrated and/or discrete logic circuitry that provides processing unit 1 with massive parallel processing capabilities suitable for graphics processing. In some examples, processing unit 1 may be configured to perform one or more techniques described herein using hardware, software, or a combination thereof.

In some examples, processing unit 1 may be configured to encode (e.g., compress) content in accordance with one or more techniques described herein, such as in the simplified example shown in FIG. 1C, discussed below. In such examples, processing unit 1 may be referred to as a content encoder. In other examples, processing unit 1 may be configured to decode (e.g., decompress) content in accordance with one or more techniques described herein. In such examples, processing unit 1 may be referred to as a content decoder. In other examples, may be configured to encode and/or decode content in accordance with one or more techniques described herein.

FIG. 1C is a block diagram illustrating an example where processing unit 1 may be configured to encode pixel data. For example, processing unit 1 may be configured to receive pixel data. Processing unit 1 may be configured to store received pixel data in internal memory 3, such as in a buffer allocated in internal memory 3. Processing unit 1 may be configured to perform one or more processes (e.g., color space conversion) on the received pixel data before encoding the pixel data in accordance with one or more techniques described herein. Processing unit 1 may be configured to encode the pixel data (e.g., the pixel data as received or as further processed), and output the encoded pixel data. The encoded pixel data may be in the form of a bitstream. The bitstream may include a sequence of bits that form a coded representation of the pixel data and associated data. The bitstream may have a fixed bitrate. For example, the bitstream may have a fixed bitrate to comply with a communication protocol, such as High-Definition Multimedia Interface (HDMI) protocol, DisplayPort protocol, or Mobile Industry Processor Interface (MIPI) Display Serial Interface (DSI) protocol. In some examples, the fixed bitrate may be the maximum bitrate allowed by the communication protocol. In other examples, the fixed bitrate may be less than the maximum bitrate allowed by the communication protocol.

After encoding content, processing unit 1 may be configured to cause the encoded pixel data to be sent to a display device. In some examples, processing unit 1 may be configured to send the encoded pixel data to a display device over a link (e.g., a display link in conformance with a display link protocol, such as HDMI protocol, DisplayPort protocol, MIPI DSI protocol, or another communication protocol). In other examples, processing unit 1 may be configured to send the encoded pixel data to a transmitter, where the transmitter may be configured to send the encoded pixel data over the display link. Otherwise described, processing unit 1 may be configured to output the encoded pixel data directly or indirectly into the display link.

In turn, a display device connected may be configured to receive the encoded content over the link. The display device may be configured to decode, such as with a content decoder described herein, the encoded content, and present the decoded content on a display. In some examples, the display device may be configured to perform additional processing on the decoded content before presenting the decoded content via the display.

In some examples, processing unit 1 may be configured to encode pixel data in accordance with a midpoint prediction (MPP) mode and/or a midpoint prediction fallback (MPPF) mode. MPPF mode may be a variant of MPP mode with a fixed step size (i.e., the fixed step size corresponds to MPPF mode), such that the MPPF mode rate is less than the average rate (e.g., average block rate) of the encoder (e.g., processing unit 1). In accordance with MPP mode or MPPF mode, processing unit 1 may be configured to predict one or more samples of a current block from a midpoint value. In some examples, MPP mode may be used in the presence of random noise (e.g., in the presence of little or no spatial correlation between samples of a block, slice, or image), since random noise may not be predicted efficiently using transform or block prediction modes.

In some examples, processing unit 1 may be configured to perform error diffusion on pixel data in conjunction with one or more encoding techniques (e.g., MPP mode or MPPF mode) as described herein. For example, processing unit 1 may be configured to determine the quantization error of one or more samples and may be configured to diffuse the quantization error into one or more samples. Diffusing quantization error in accordance with the techniques described herein may result in one or more benefits or improvements, such as the reduction or minimization of accumulated error, enhanced content quality after being decoded (e.g., improve the representation/perceptual quality of random noise in the content after being decoded), and/or increased data compression (e.g., increasing the data compression ratio from 3:1 to 4:1 in some examples).

In accordance with the techniques described herein, processing unit 1 may be configured to perform midpoint prediction (MPP) mode and midpoint prediction fallback (MPPF) mode coding using error diffusion to enhance the perceptual quality of random noise at high compression levels. The techniques described herein may have minimal impact on content which does not contain random noise.

FIG. 2 illustrates an example coding block 300 in accordance with the techniques described herein. In some examples, coding block 300 may be referred to as an VDC-M block of dimension 8×2. That is, coding block 300 may be 8 samples wide and 2 sample high. However, any size coding blocks may be used with the techniques of this disclosure. In some examples, the values of coding blocks 300 may be color component sample values of a pixel. For example, the values in coding block 300 may be an R, G, or B sample when pixels are coded in an RGB color space. In examples, the values in coding block 300 may be luma or chroma sample values, such as for YUV, YCrCb, YCoCg, or other color spaces using luminance and chrominance samples. The techniques of this disclosure may be use for any color component in any color space.

Figure 4:
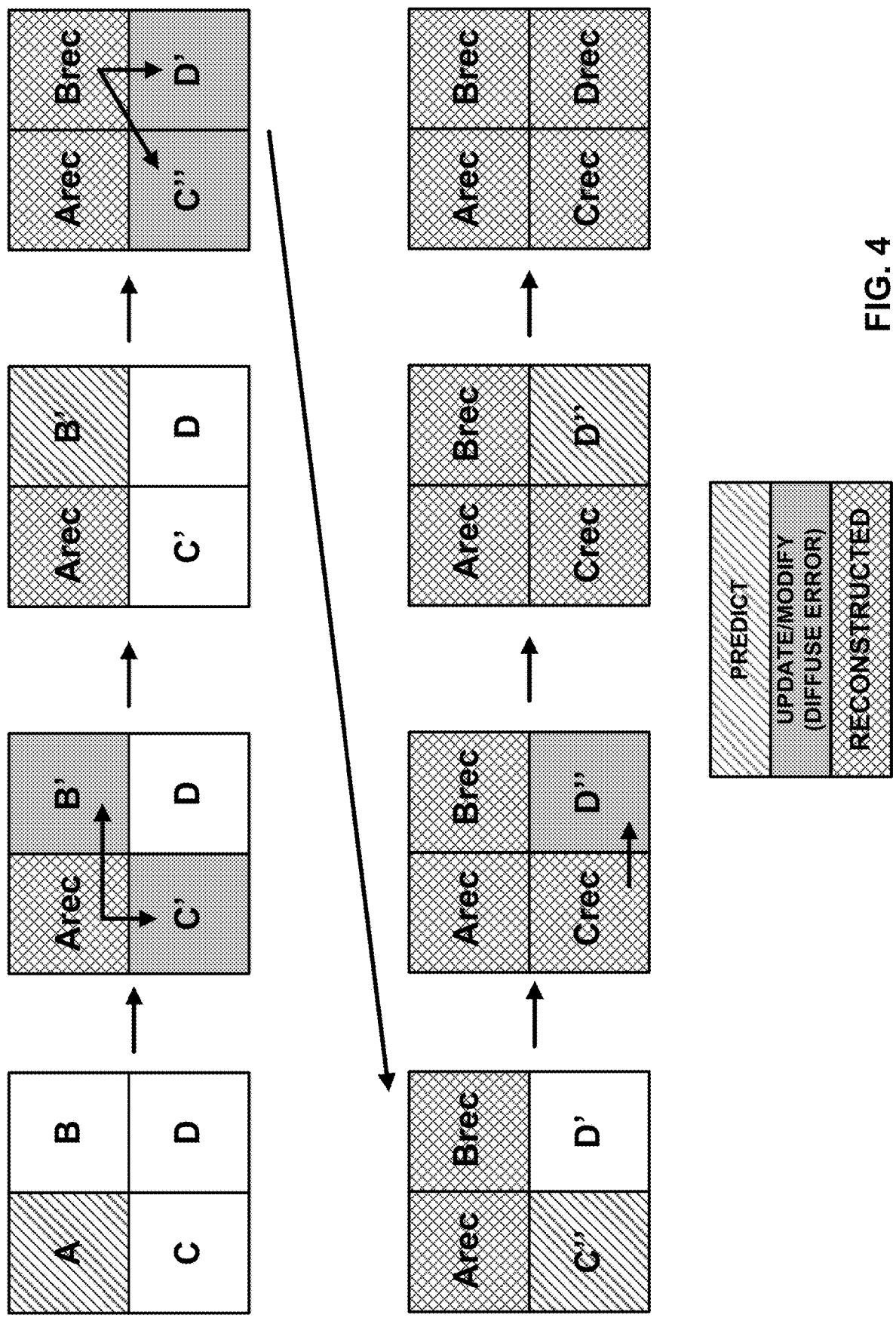
FIG. 4 illustrates an example of error diffusion in accordance with the techniques of this disclosure.
Figure 5:
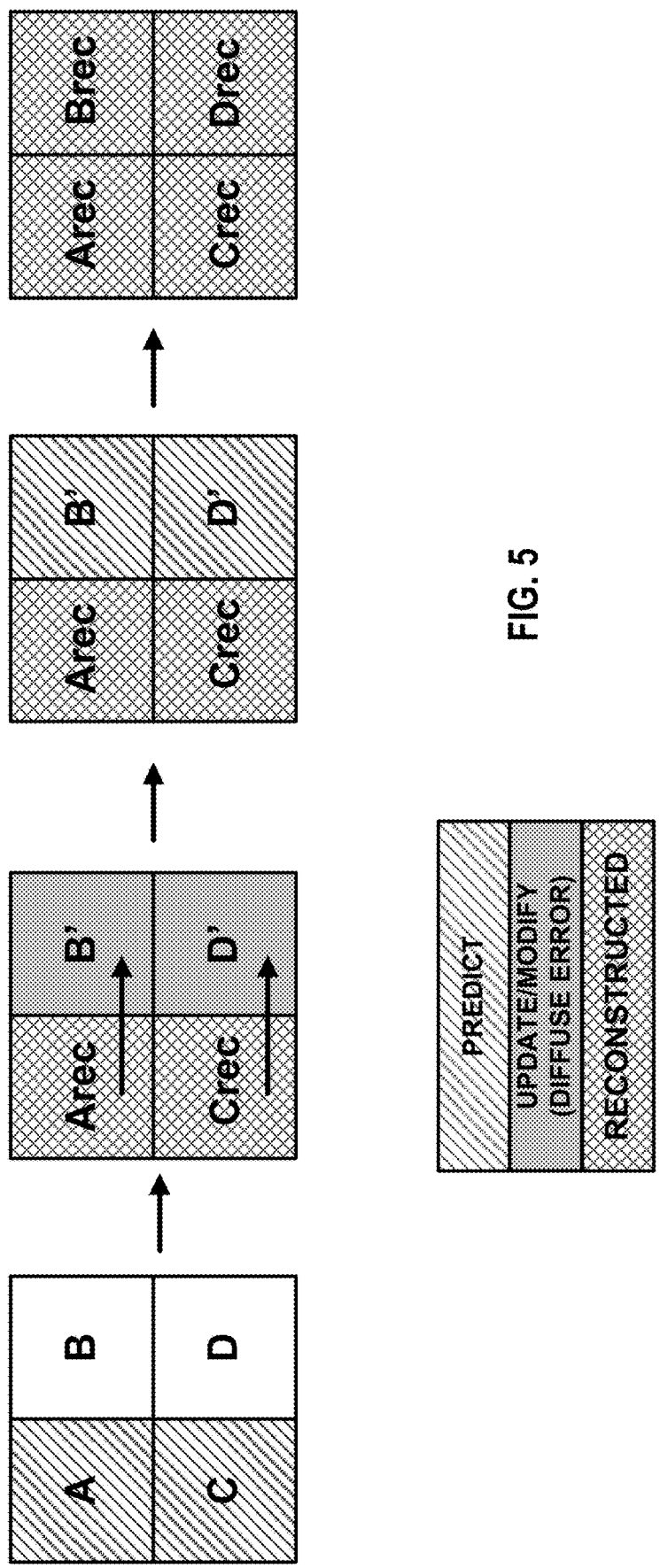
FIG. 5 illustrates an example of error diffusion in accordance with the techniques of this disclosure.

To allow for parallel implementation in hardware, and to reduce the worst-case critical path, the coding block 300 may be partitioned into four 2×2 sub-blocks 302, 304, 306, and 308. Each 2×2 sub-block may be processed independently as described herein. The techniques described herein may pertain to implementation examples of MPP mode with error diffusion (MPP+ED). In other examples, the techniques described herein may pertain to implementation examples of midpoint prediction fallback MPPF mode with error diffusion (MPPF+ED). FIGS. 4 and 5, discussed in more detail below, are two examples of implementations in accordance with the techniques described herein. FIG. 4 may be an example of a "full" implementation, since the full implementation has a longer critical path than the "light" implementation (an example of a "light" implementation is shown in FIG. 5), but may give improved results.

In addition to adding error diffusion, the MPP+ED mode of this disclosure may also impact the calculation of the midpoint value used for prediction. In one example implementation of MPP mode, processing unit 1 may calculate a single midpoint value (MP) for the current 8×2 block and use the single midpoint value to predict all 16 samples in coding block 300. In MPP+ED mode, processing unit 1 may be configured to calculate a separate midpoint value, in some examples, for each 2×2 sub-block from the neighboring samples (for example, in the previous reconstructed line, as shown in FIG. 2). Sample values of a previous reconstructed line (e.g., the bottom row of pixels in blocks above coding block 300) may be stored in a memory called a line buffer. For blocks that are not in the first line of the slice (NFLS), processing unit 1 may calculate the midpoint predictor for each 2×2 sub-block as the average of the two samples directly above from the previous reconstructed line. For example, the midpoint predictor for the first sub-block 302 is: MP=(X+Y+1)>>1, where X and Y are the above-neighboring samples to the respective 2×2 sub-block 302, which is described further below with respect to FIG. 2, where « is a bit-wise right shift.

For blocks that are within the first line of the slice (FLS), processing unit 1 may calculate the midpoint value as an average of the four samples from the same sub-block in the previously reconstructed block. In this case, the midpoint predictor for the first sub-block 302 would be: MP=($\hat{A}$+$\hat{B}$+$\hat{C}$+$\hat{D}$+2)>>2, where $\hat{X}$ represents a sample from the previous reconstructed block, and where « is a bit-wise right shift. As an example, referring to FIG. 3, the samples corresponding to $\hat{A}$, $\hat{B}$, $\hat{C}$, and $\hat{D}$ for sub-block 302 would respectively be A4, B4, C4, and D4 of previously reconstructed block 302'. Otherwise described, the midpoint predictor for sub-block 302 may be described as: MP=(A4+B4+C4+D4+2)>>2, where A4, B4, C4, and D4 are each a reconstructed sample in previously reconstructed sub-block 302'. This example situation is more fully described below. Additionally, for the first block within a slice, MP may be initialized to a fixed value equal to half the dynamic range since no reference samples will be available in this case.

In some examples, the error diffusion techniques described in this disclosure may be applied only at the encoder side. In such examples, the behavior of MPP mode at the decoder may be identical to the previous implementation, in that the received quantized residuals will be de-quantized and reconstructed without any additional steps being performed.

Referring back to FIG. 2, FIG. 2 illustrates an example coding block 300 having an example size. In the example of FIG. 2, coding block 300 has a size of 8×2. In some examples, processing unit 1 may be configured to partition coding block 300 into two or more sub-blocks. In the example of FIG. 2, processing unit 1 may partition coding block 300 into four 2×2 sub-blocks, shown as sub-blocks 302, 304, 306, and 308. Sub-block 302 includes samples A, B, C, and D. Sub-block 304 includes samples A1, B1, C1, and D1. Sub-block 306 includes samples A2, B2, C2, and D2. Sub-block 308 includes samples A3, B3, C3, and D3. Each of the samples corresponding to each of the sub-blocks may correspond to a single component of a corresponding pixel. It is therefore understood that the techniques described herein may be repeated for the samples corresponding to other component(s), if any, of the pixels with which the samples shown in FIG. 2 are associated. In other examples, processing unit 1 may be configured to determine that samples corresponding to a first component of a plurality of pixels lack or have little spatial correlation and that samples corresponding to a second component of the plurality of pixels have higher spatial correlation. In such examples, processing unit 1 may be configured to perform the techniques pertaining to error diffusion described herein on the samples corresponding to the first component but not on the samples corresponding to the second component.

Shown above coding block 300 is a line of samples that were previously reconstructed, meaning that the line of samples shown above coding block 300 are reconstructed samples. Reconstructed samples may be stored in a line buffer. Samples X and Y are the above-neighboring samples to samples A and B that have been reconstructed. Similarly, samples X1 and Y1 are the above-neighboring samples to samples A1 and B1, and so on. In some examples, processing unit 1 may be configured to process each sub-block of coding block 300 independently from the other sub-blocks. In some examples, processing unit 1 may be configured to process each sub-block of coding block 300 in parallel with but independently from the other sub-blocks.

Processing unit 1 may be configured to calculate a separate midpoint predictor (sometimes referred to as a midpoint value) for each sub-block from two or more neighboring samples, such as the two above-neighboring samples. FIG. 2 illustrates an example where coding block 300 is not in the first line of, for example, a slice. In such examples, the midpoint predictor (MP) for each 2×2 sub-block may be the average of the two samples directly above (e.g., the above-neighboring samples) from the previous reconstructed line. For example, processing unit 1 may be configured to calculate the midpoint predictor for sub-block 302 as follows: MP=(X+Y+1)>>1. Similarly, processing unit 1 may be configured to calculate the midpoint predictor for sub-block 304 as follows: MP=(X1+Y1+1)>>1, and so on for the other sub-blocks.

In other examples, coding block 300 may be within the first line of, for example, a slice. In such examples, above-neighboring samples are unavailable (e.g., because no above-neighboring samples exist or because the above-neighboring samples are invalid targets due to, for example, being in a different slice). In such examples, the midpoint predictor (MP) for each 2×2 sub-block may be the average of the four samples from the same positioned sub-block in the previously reconstructed coding block. Otherwise described, the MP for each 2×2 sub-block may be the average of four reconstructed samples of a sub-block in the same position in a previously reconstructed coding block.

For example, with reference to FIG. 3, processing unit 1 may be configured to calculate the midpoint predictor for sub-block 302 as follows:

$$MP = (\hat{A} + \hat{B} + \hat{C} + \hat{D} + 2) >> 2$$

Here, the hat above the sample represents that the sample is from the previous reconstructed block (i.e., the sample is a reconstructed sample). FIG. 3 illustrates an example in which above-neighboring samples are unavailable for the encoding of coding block 300. In the example of FIG. 3, coding blocks 300 and 300' each have a size of 8×2 and are both shown as being partitioned into four 2×2 sub-blocks. The prominent vertical line between coding blocks 300 and 300' is just to help show where coding block 300' ends and where coding block 300 begins. In the example of FIG. 3, coding block 300' is a previously reconstructed coding block, meaning that the samples of coding block 300' have already been reconstructed. The MP for sub-block 302 may be the average of the four samples from the same positioned sub-block (i.e., sub-block 302') in coding block 300'. Similarly, the MP for sub-block 304 may be the average of the four samples from the same positioned sub-block (i.e., sub-block 304') in coding block 300'.

In other examples, coding block 300 may be the first coding block of, for example, a slice. In such examples, above-neighboring samples are unavailable (e.g., because no above-neighboring samples exist or because the above-neighboring samples are invalid targets due to, for example, being in a different slice) and a previously reconstructed block within the same slice will be unavailable to the left (or in the direction of the scan) since coding block 300 is the first coding block in the slice. In such examples, the midpoint predictor (MP) may be equal to half the dynamic range since no reference samples are available. The dynamic range is the number of possible values for the samples. For example, if the samples are 8-bit component values in the RGB color space, then the values of the samples may range from 0 to 255, meaning that the dynamic range is 256. Half of 256 is 128, which would mean that the MP for each sub-block of coding block 300 would be 128 when coding block 300 is the first coding block in a slice.

In some examples, processing unit 1 may be configured to determine whether to perform error diffusion on pixel data in accordance with the techniques described herein based on a threshold value $T_{ED}$. For example, processing unit 1 may be configured to determine whether to diffuse quantization error associated with a first sample of a sub-block of a coding unit to one or more samples of the same sub-block based on the threshold value $T_{ED}$. As another example, processing unit 1 may be configured to perform error diffusion on pixel data in conjunction with MPP mode or MPPF mode based on a threshold value $T_{ED}$. Processing unit 1 may be configured to perform error diffusion when (bitDepth−stepSize)≤$T_{ED}$ for the current component, where stepSize represents the quantization step size for MPP mode or MPPF mode and bitDepth represents the numbers of bits per sample.

In some examples, the current component may refer to the current coding block, current sample, current color component, or the like. For example, when (bitDepth−stepSize)≤$T_{ED}$ for the current component, processing unit 1 may be configured to perform MPP+ED (full), MPP+ED (light), MPPF+ED (full), or MPPF+ED (light) as described herein. If (bitDepth−stepSize)>$T_{ED}$, then MPP mode or MPPF mode may be used without error diffusion. In such an example, processing unit 1 may be configured to set any error terms equal to zero. This may be done to avoid any reduction in peak signal-to-noise ratio (PSNR) for coding typical content. In some examples, the threshold value $T_{ED}$ may be equal to 3. In other examples, the threshold value $T_{ED}$ may be equal to a value less than or more than 3.

Processing unit 1 may be configured to perform error diffusion on one or more sub-blocks in parallel. Error diffusion will be described with respect to sub-block 302 of coding block 300 shown in FIGS. 2 and 3. It is understood that the sizes of sub-block 302 and/or coding block 300 may differ in other examples. For example, the coding block size may be 8×2, which may be partitioned into two 4×2 sub-blocks. Processing unit 1 may be configured to diffuse error into one or more samples of a sub-block, depending on the example.

Figure 3:
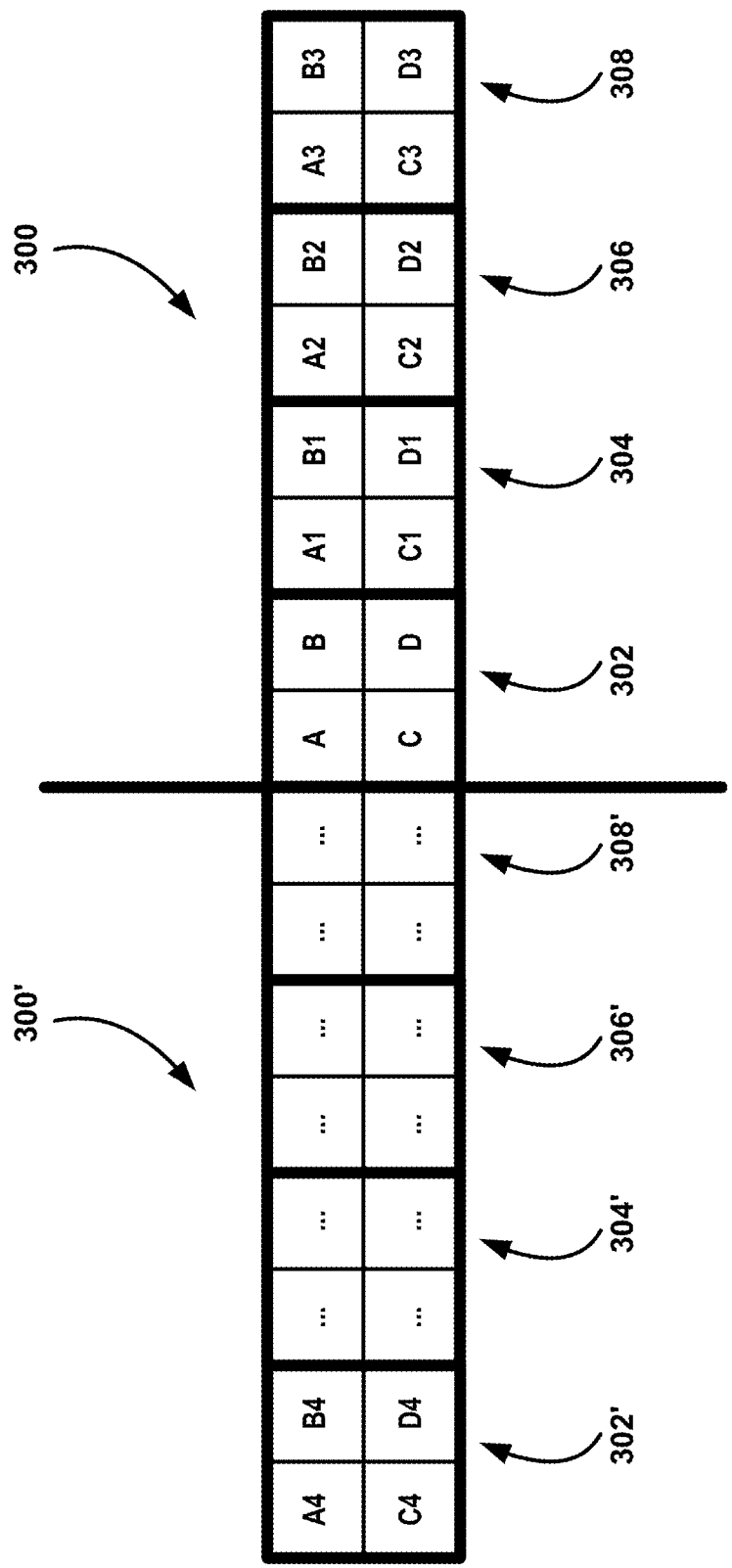
FIG. 3 illustrates an example coding block in accordance with the techniques of this disclosure.

FIG. 4 illustrates an example of error diffusion relative to sub-block 302 depicted in FIGS. 2 and 3. In some examples, FIG. 4 may be described as illustrating a full implementation example of MPP+ED that may include sequential processing of source samples within a 2×2 sub-block. The 2×2 sub-block size is used as an example. In other examples, full implementation described in this disclosure may be extended to other block sizes, such as 4×2 sub-blocks, where 8×2 block is partitioned into two 4×2 sub-blocks. Choosing a bigger sub-block may improve the subjective performance at the expense of increasing the critical path in a hardware implementation. Therefore, the selection of a particular sub-block size may depend on the tradeoff between the performance and the critical path.

Referring to FIG. 4, processing unit 1 may process each sample of sub-block 302 sequentially. FIG. 4 shows the following steps:
1. Predict sample A from MP, quantize, reconstruct
2. Diffuse error ((A−$A_{rec}$+1)>>1) to samples B (B'), C (C')
3. Predict sample B' from MP, quantize, reconstruct
4. Diffuse error ((B'−$B'_{rec}$+1)>>1) to samples C' (C''), D (D')
5. Predict sample C'' from MP, quantize, reconstruct
6. Diffuse error ((C''−$C''_{rec}$+1)>>1) to sample D'(D'')
7. Predict sample D'' from MP, quantize, reconstruct In some examples, (Sample−$Sample_{rec}$) may constitute an error term. In other examples, ((Sample−$Sample_{rec}$+1)>>1) may constitute the error term. In some examples, any error described herein may be signed. In some examples, the MP may be the same for each of steps 1, 3, 5, and 7, such as when the MP is calculated on a per sub-block basis.

With reference to step 1 above, processing unit 1 may be configured to predict sample A from the midpoint predictor for the sub-block resulting in a predicted sample A. Predicted sample A is to be distinguished from sample A (i.e., source sample A). For example, predicted sample A may be equal to the midpoint predictor for the current sub-block, which may be described as $A_{prediction}$=MP. Processing unit 1 may be configured to calculate the residual for sample A, meaning the difference between sample A and predicted sample A, which may be described as $A_{residual}$=($A_{source}$−$A_{prediction}$) or other suitable nomenclature such as $A_{residual}$=(A−$A_{prediction}$). Processing unit 1 may be configured to quantize the residual for sample A. Processing unit 1 may be configured to reconstruct sample A from the quantized residual for sample A by, for example, de-quantizing the residual for sample A and then adding the midpoint predictor for the sub-block to the de-quantized residual for sample A resulting in reconstructed sample A. Reconstructed sample A may be described as the de-quantized residual for sample A plus the midpoint predictor for the sub-block.

In step 2 above, processing unit 1 may be configured to diffuse error associated with sample A to samples B and C.

In some examples, the error associated with sample A may be defined as $(A-A_{rec})$, where $A_{rec}$ is reconstructed sample A. The error associated with sample A may be referred to as sample A error. In some examples, processing unit 1 may be configured to evenly distribute sample A error to samples B and C. For example, processing unit 1 may be configured to add sample A error (unmodified) to samples B and C. As another example, processing unit 1 may be configured to divide sample A error by a value, where the value may, in some examples, be the number of samples the error is being infused into (e.g., two in this example). In some examples, such a division may be represented by $((A-A_{rec}+1)\gg 1)$. In other examples, such a division may be represented by $((A-A_{rec})\gg 1)$. In other examples, the value by which sample A error may be divided may be a fixed value irrespective of the how many samples the error is being infused into. Processing unit 1 may be configured to add the modified sample A error to samples B and C.

In other examples, processing unit 1 may be configured to unevenly distribute sample A error to samples B and C. For example, processing unit 1 may be configured to add a percentage of sample A error to sample B and a different percentage of sample A error to sample C. In some examples, processing unit 1 may be configured to determine the uneven diffusion of sample A error to samples B and C based on the difference between sample B and sample A relative to the difference between sample C and sample A.

FIG. 4 illustrates the diffusion of sample A error (e.g., modified or unmodified sample A error) into samples B and C in the second block from the left in the top row. Sample B' represents sample B as modified by sample A error. Similarly, sample C' represents sample C as modified by sample A error.

In step 3 above, processing unit 1 may be configured to predict sample B' from the midpoint predictor for the sub-block resulting in a predicted sample B'. Predicted sample B' is to be distinguished from sample B'. For example, predicted sample B' may be equal to the midpoint predictor for the current sub-block, which may be described as $B'_{prediction}=MP$. Processing unit 1 may be configured to calculate the residual for sample B', meaning the difference between sample B' and predicted sample B', which may be described as $B'_{residual}=(B'-B'_{prediction})$. Processing unit 1 may be configured to quantize the residual for sample B'. Processing unit 1 may be configured to reconstruct sample B' from the quantized residual for sample B' by, for example, de-quantizing the residual for sample B' and then adding the midpoint predictor for the sub-block to the de-quantized residual for sample B' resulting in reconstructed sample B'. Reconstructed sample B' may be described as the de-quantized residual for sample B' plus the midpoint predictor for the sub-block.

In step 4 above, processing unit 1 may be configured to diffuse error associated with sample B' to samples C' and D. In some examples, the error associated with sample B' may be defined as $(B'-B'_{rec})$, where $B'_{rec}$ is reconstructed sample B'. The error associated with sample B' may be referred to as sample B' error. In some examples, processing unit 1 may be configured to evenly distribute sample B' error to samples C' and D. For example, processing unit 1 may be configured to add sample B' error (unmodified) to samples C' and D. As another example, processing unit 1 may be configured to divide sample B' error by a value, where the value may be the number of samples the error is being infused into (e.g., two in this example). In some examples, such a division may be represented by $((B'-B'_{rec}+1)\gg 1)$. In other examples, such a division may be represented by $((B'-B'_{rec})\gg 1)$. In other examples, the value by which sample B' error may be divided may be a fixed value irrespective of the how many samples the error is being infused into. Processing unit 1 may be configured to add the modified sample B' error to samples C' and D.

In other examples, processing unit 1 may be configured to unevenly distribute sample B' error to samples C' and D. For example, processing unit 1 may be configured to add a percentage of sample B' error to sample C' and a different percentage of sample B' error to sample D. In some examples, processing unit 1 may be configured to determine the uneven diffusion of sample B' error to samples C' and D based on the difference between sample C' and sample B' relative to the difference between sample D and sample B'.

FIG. 4 illustrates the diffusion of sample B' error (e.g., modified or unmodified sample B' error) into samples C' and D in the top-right block. Sample C" represents sample C' as modified by sample B' error. Similarly, sample D' represents sample D as modified by sample B' error.

In step 5 above, processing unit 1 may be configured to predict sample C" from the midpoint predictor for the sub-block resulting in a predicted sample C". Predicted sample C" is to be distinguished from sample C". For example, predicted sample C" may be equal to the midpoint predictor for the current sub-block, which may be described as $C''_{prediction}=MP$. Processing unit 1 may be configured to calculate the residual for sample C", meaning the difference between sample C" and predicted sample C", which may be described as $C''_{residual}=(C''-C''_{prediction})$. Processing unit 1 may be configured to quantize the residual for sample C". Processing unit 1 may be configured to reconstruct sample C" from the quantized residual for sample C" by, for example, de-quantizing the residual for sample C" and then adding the midpoint predictor for the sub-block to the de-quantized residual for sample C" resulting in reconstructed sample C". Reconstructed sample C" may be described as the de-quantized residual for sample C" plus the midpoint predictor for the sub-block.

In step 6 above, processing unit 1 may be configured to diffuse error associated with sample C" to sample D'. In some examples, the error associated with sample C" may be defined as $(C''-C''_{rec})$, where $C''_{rec}$ is reconstructed sample C". The error associated with sample C" may be referred to as sample C" error. In some examples, processing unit 1 may be configured to distribute sample C" error to sample D'. For example, processing unit 1 may be configured to add sample C" error (unmodified) to sample D'. As another example, processing unit 1 may be configured to divide sample C" error by a value, where the value may, in some examples, be the number of samples the error is being infused into. In other examples, the value by which sample C" error may be divided may be a fixed value irrespective of how many samples the error is being infused into. The fixed value may be a value of 2 in some examples. Such a division may be represented by $((C''-C''_{rec}+1)\gg 1)$. In other examples, such a division may be represented by $((C''-C''_{rec})\gg 1)$. Processing unit 1 may be configured to add the modified sample C" error to sample D'.

In other examples, processing unit 1 may be configured to unevenly distribute sample C" error to sample D'. For example, processing unit 1 may be configured to add a percentage of sample C" error to sample D'. In some examples, processing unit 1 may be configured to determine the uneven diffusion of sample C" error to sample D' based on the difference between sample C" and sample D'.

FIG. 4 illustrates the diffusion of sample C" error (e.g., modified or unmodified sample C" error) into sample D' in the second block from the left in the bottom row. Sample D" represents sample D' as modified by sample C" error.

In step 7 above, processing unit 1 may be configured to predict sample D" from the midpoint predictor for the sub-block resulting in a predicted sample D". Predicted sample D" is to be distinguished from sample D". For example, predicted sample D" may be equal to the midpoint predictor for the current sub-block, which may be described as $D"_{predictron}=MP$. Processing unit 1 may be configured to calculate the residual for sample D", meaning the difference between sample D" and predicted sample D", which may be described as $D'_{residual}=(D"-D"_{prediction})$. Processing unit 1 may be configured to quantize the residual for sample D". Processing unit 1 may be configured to reconstruct sample D" from the quantized residual for sample D" by, for example, de-quantizing the residual for sample D" and then adding the midpoint predictor for the sub-block to the de-quantized residual for sample D", resulting in reconstructed sample D". Reconstructed sample D" may be described as the de-quantized residual for sample D" plus the midpoint predictor for the sub-block.

FIG. 5 illustrates another example of error diffusion relative to sub-block 302 depicted in FIGS. 2 and 3. In some examples, FIG. 4 may be described as illustrating a light implementation example of MPP+ED. The light implementation may be a lower complexity version of MPP+ED, which may enable increased parallelism in a hardware implementation. In some examples, this parallelism may be afforded by two parallel paths for each 2×2 sub-block.

Relative to the example illustrated in FIG. 4, the example of FIG. 5 may enable increased parallelism since each sample of sub-block 302 may not be processed sequentially. For example, in a 2×2 sub-block example, each sub-block may be processed in two parallel paths. FIG. 5 shows the following steps:
 1. Parallel path 1
   a. Predict sample A from MP, quantize, reconstruct
   b. Diffuse error $(A-A_{rec})$ to sample B (B')
   c. Predict sample B' from MP, quantize, reconstruct
 2. Parallel path 2
   a. Predict sample C from MP, quantize, reconstruct
   b. Diffuse error $(C-C_{rec})$ to sample D (D')
   c. Predict sample D' from MP, quantize, reconstruct In some examples, the MP may be the same for each of steps (a) and (c) under both parallel paths 1 and 2, such as when the MP is calculated on a per sub-block basis.

With reference to step (a) above under parallel path 1, processing unit 1 may be configured to predict sample A from the midpoint predictor for the sub-block resulting in a predicted sample A. Predicted sample A is to be distinguished from sample A (i.e., source sample A). For example, predicted sample A may be equal to the midpoint predictor for the current sub-block, which may be described as $A_{prediction}=MP$. Processing unit 1 may be configured to calculate the residual for sample A, meaning the difference between sample A and predicted sample A, which may be described as $A_{residual}=(A_{source}-A_{prediction})$ or other suitable nomenclature such as $A_{residual}=(A-A_{prediction})$. Processing unit 1 may be configured to quantize the residual for sample A. Processing unit 1 may be configured to reconstruct sample A from the quantized residual for sample A by, for example, de-quantizing the residual for sample A and then adding the midpoint predictor for the sub-block to the de-quantized residual for sample A resulting in reconstructed sample A. Reconstructed sample A may be described as the de-quantized residual for sample A plus the midpoint predictor for the sub-block.

In step (b) above under parallel path 1, processing unit 1 may be configured to diffuse error associated with sample A to sample B. In some examples, the error associated with sample A may be defined as $(A-A_{rec})$, where $A_{rec}$ is reconstructed sample A. The error associated with sample A may be referred to as sample A error. In some examples, processing unit 1 may be configured to distribute sample A error to sample B. For example, processing unit 1 may be configured to add sample A error (unmodified) to sample B. As another example, processing unit 1 may be configured to divide sample A error by a value, where the value may, in some examples, be the number of samples the error is being infused into. In other examples, the value by which sample A error may be divided may be a fixed value irrespective of the how many samples the error is being infused into. The fixed value may be a value of 2 in some examples. Such a division may be represented by $((A-A_{rec}+1)>>1)$. In other examples, such a division may be represented by $((A-A_{rec})>>1)$. Processing unit 1 may be configured to add the modified sample A error to sample B.

FIG. 5 illustrates the diffusion of sample A error (e.g., modified or unmodified sample A error) into sample B in the second block from the left. Sample B' represents sample B as modified by sample A error.

In step (c) above under parallel path 1, processing unit 1 may be configured to predict sample B' from the midpoint predictor for the sub-block resulting in a predicted sample B'. Predicted sample B' is to be distinguished from sample B'. For example, predicted sample B' may be equal to the midpoint predictor for the current sub-block, which may be described as $B'_{prediction}=MP$. Processing unit 1 may be configured to calculate the residual for sample B', meaning the difference between sample B' and predicted sample B', which may be described as $B'_{residual}=(B'-B'_{prediction})$. Processing unit 1 may be configured to quantize the residual for sample B'. Processing unit 1 may be configured to reconstruct sample B' from the quantized residual for sample B' by, for example, de-quantizing the residual for sample B' and then adding the midpoint predictor for the sub-block to the de-quantized residual for sample B', resulting in reconstructed sample B'. Reconstructed sample B' may be described as the de-quantized residual for sample B' plus the midpoint predictor for the sub-block.

With reference to step (a) above under parallel path 2, processing unit 1 may be configured to predict sample C from the midpoint predictor for the sub-block resulting in a predicted sample C. Predicted sample C is to be distinguished from sample C (i.e., source sample C). For example, predicted sample C may be equal to the midpoint predictor for the current sub-block, which may be described as $C_{prediction}=MP$. Processing unit 1 may be configured to calculate the residual for sample C, meaning the difference between sample C and predicted sample C, which may be described as $C_{residual}=(C_{source}-C_{prediction})$ or other suitable nomenclature such as $C_{residual}=(C-C_{prediction})$. Processing unit 1 may be configured to quantize the residual for sample C. Processing unit 1 may be configured to reconstruct sample C from the quantized residual for sample C by, for example, de-quantizing the residual for sample C and then adding the midpoint predictor for the sub-block to the de-quantized residual for sample C, resulting in reconstructed sample C. Reconstructed sample C may be described as the de-quantized residual for sample C plus the midpoint predictor for the sub-block.

In step (b) above under parallel path 2, processing unit 1 may be configured to diffuse error associated with sample C to sample D. In some examples, the error associated with sample C may be defined as $(C-C_{rec})$, where $C_{rec}$ is reconstructed sample C. The error associated with sample C may be referred to as sample C error. In some examples, processing unit 1 may be configured to distribute sample C error to sample D. For example, processing unit 1 may be configured to add sample C error (unmodified) to sample D. As another example, processing unit 1 may be configured to divide sample C error by a value, where the value may, in some examples, be the number of samples the error is being infused into. In other examples, the value by which sample C error may be divided may be a fixed value irrespective of how many samples the error is being infused into. The fixed value may be a value of 2 in some examples. Such a division may be represented by $((C-C_{rec}+1)\gg 1)$. In other examples, such a division may be represented by $((C-C_{rec})\gg 1)$. Processing unit 1 may be configured to add the modified sample C error to sample D.

FIG. 5 illustrates the diffusion of sample C error (e.g., modified or unmodified sample C error) into sample D in the second block from the left. Sample D' represents sample D as modified by sample C error.

In step (c) above under parallel path 2, processing unit 1 may be configured to predict sample D' from the midpoint predictor for the sub-block resulting in a predicted sample D'. Predicted sample D' is to be distinguished from sample D'. For example, predicted sample D' may be equal to the midpoint predictor for the current sub-block, which may be described as $D'_{prediction}=MP$. Processing unit 1 may be configured to calculate the residual for sample D', meaning the difference between sample B' and predicted sample B', which may be described as $D'_{residual}=(D'-D'_{prediction})$. Processing unit 1 may be configured to quantize the residual for sample D'. Processing unit 1 may be configured to reconstruct sample D' from the quantized residual for sample D' by, for example, de-quantizing the residual for sample D' and then adding the midpoint predictor for the sub-block to the de-quantized residual for sample D', resulting in reconstructed sample D'. Reconstructed sample D' may be described as the de-quantized residual for sample D' plus the midpoint predictor for the sub-block.

In some examples, coding block 300 may be portioned into the smaller sub-block (e.g., a 2×1 or 1×2). In such examples, processing unit 1 may be configured to calculate eight MPs (e.g., one for each sub-block), and perform eight parallel paths (e.g., one for each sub-block). Processing unit 1 may be configured to perform each parallel path in such examples in a manner similar to parallel paths 1 and 2 described with respect to FIG. 5. For example, while FIG. 5 may be described as having two parallel paths per sub-block, examples involving 2×1 (or 1×2 sub-blocks) may be described as having a parallel path per sub-block. While both of these examples have eight parallel paths (e.g., 2 parallel paths for each 2×2 sub-block amounts to the same number of parallel paths for an example involving eight 2×1 sub-blocks), the error diffusion may be different because the MP may be calculated differently in these examples (e.g., an MP for a 2×2 sub-block may be different than the MPs calculated for the two 2×1s that may otherwise make up the 2×2 block).

Figure 6:
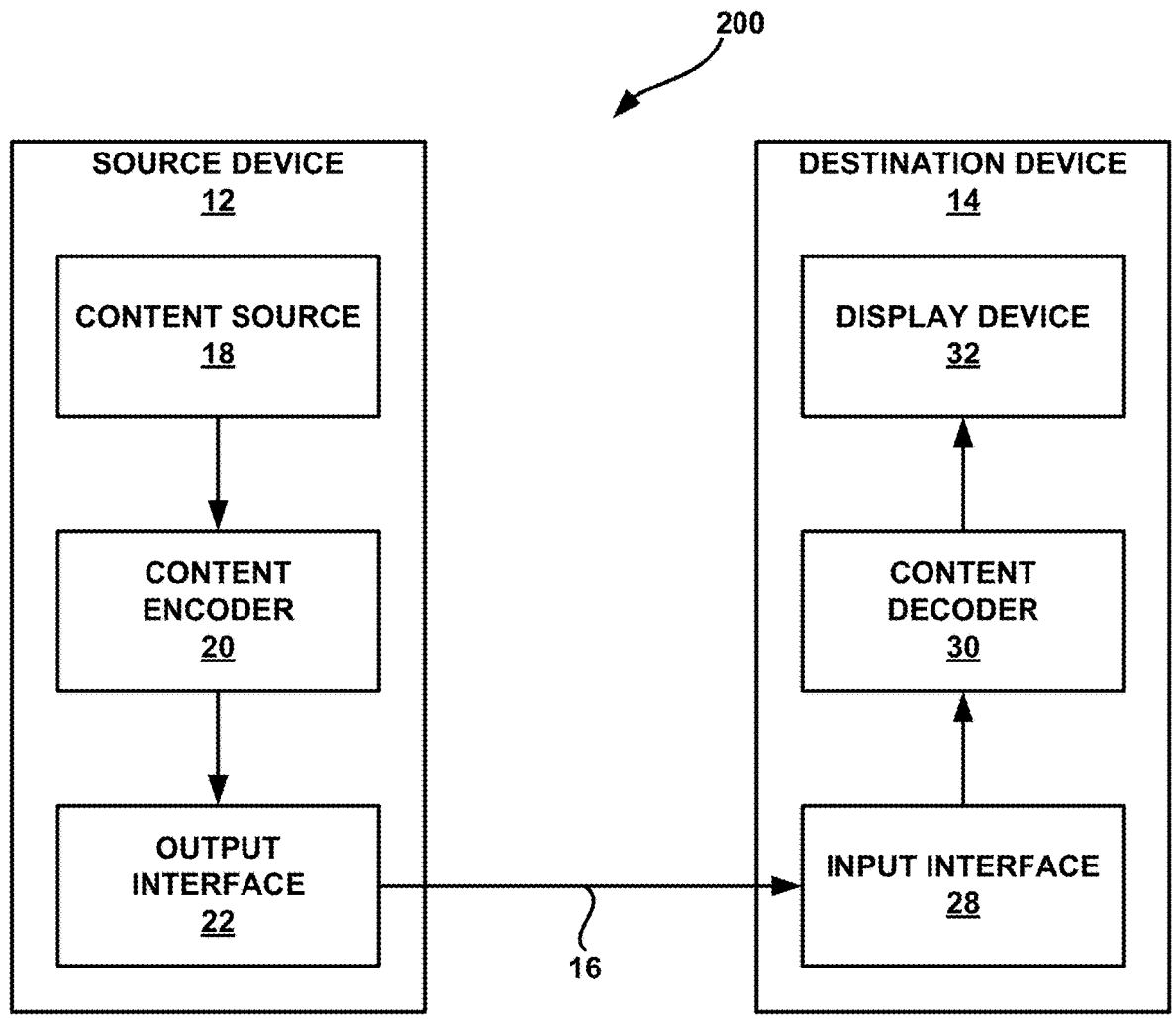
FIG. 6 is a block diagram that illustrates an example image content coding system in accordance with the techniques of this disclosure.

FIG. 6 is a block diagram that illustrates an example content coding system 200 that may utilize the techniques of this disclosure. Content coding system 200 may, in some examples, be a more detailed example of content coding system 100 and/or content coding system 100'. As used herein, the term "coder" may generically refer to an encoder and/or decoder. For example, reference to a "content coder" may include reference to a content encoder and/or a content decoder. Similarly, as used herein, the term "coding" may generically refer to encoding and/or decoding.

Content encoder 20 and content decoder 30 of content coding system 200 represent examples of computing devices (e.g., processing units) that may be configured to perform one or more techniques for diffusing error into one or more samples in accordance with various examples described in this disclosure.

As shown in FIG. 6, content coding system 200 includes a source device 12 and a destination device 14. Source device 12 may be configured to generate encoded content. Accordingly, source device 12 may be referred to as a content encoding device or a content encoding apparatus. Destination device 14 may decode the encoded content generated by source device 12. Accordingly, destination device 14 may be referred to as a content decoding device or a content decoding apparatus. In some examples, source device 12 and destination device 14 may be separate devices, as shown. In other examples, source device 12 and destination device 14 may be on or part of the same computing device.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, augmented reality devices, virtual reality devices, wearable devices, video streaming devices, content stream devices, in-car computers, or the like.

Destination device 14 may receive, via link 16, the encoded content to be decoded. Link 16 may comprise any type of medium or device capable of moving the encoded content from source device 12 to destination device 14. In the example of FIG. 6, link 16 may comprise a communication medium to enable the source device 12 to transmit encoded content to destination device 14 in real-time. The encoded content may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14. In other examples, link 16 may be a point-to-point connection between source device 12 and destination device 14, such as a wired or wireless display link connection (e.g., an HDMI link, a DisplayPort link, MIPI DSI link, or another link over which encoded content may traverse from source device 12 to destination device 14.

In another example, link 16 may include a storage medium configured to store encoded content generated by source device 12. In this example, destination device 14 may access the storage medium via, for example, disk access or card access. The storage medium may include a variety of locally-accessed data storage media such as Blu-ray discs, DVDs, CD-ROMs, flash memory, or other suitable digital storage media for storing encoded content.

In a further example, link 16 may include a file server or another intermediate storage device configured to store encoded content generated by source device 12. In this example, destination device 14 may access encoded content stored at the file server or other intermediate storage device via streaming or download. The file server may be a type of server capable of storing encoded content and transmitting the encoded content to destination device 14. Example file servers include web servers (e.g., for a website), file transfer protocol (FTP) servers, network attached storage (NAS) devices, and local disk drives.

Destination device 14 may access the encoded content through a standard data connection, such as an Internet connection. Example types of data connections may include wireless channels (e.g., Wi-Fi connections), wired connections (e.g., DSL, cable modem, etc.), or combinations of both that are suitable for accessing encoded content data stored on a file server. The transmission of encoded content from the file server may be a streaming transmission, a download transmission, or a combination of both.

In the example of FIG. 6, source device 12 may include a content source 18, a content encoder 20, and an output interface 22. In some examples, content encoder 20 may include processing unit 1 as described herein. In such examples, content encoder 20 may be processing unit 1, or may be a computing device that includes components in addition to processing unit 1.

In some examples, output interface 22 may include a modulator/demodulator (modem) and/or a transmitter. Content source 18 may include a content capture device (e.g., a camera, such as a video camera), a memory storing previously-captured content, a memory storing content captured in real-time, a content feed (e.g., video feed) interface to receive content from a content provider, and/or a computer graphics system for generating content, or a combination of such sources of content. In some examples, content source 18 may include internal memory 3, memory 5, or processing unit 7 described with respect to FIGS. 1A-C.

Content encoder 20 may be configured to encode content from content source 18. In some examples, source device 12 may be configured to directly transmit encoded content to destination device 14 via output interface 22. In other examples, the encoded content may also be stored onto a storage medium or a file server for later access by destination device 14 for decoding and/or playback.

In the example of FIG. 6, destination device 14 includes an input interface 28, a content decoder 30, and a display device 32. In some examples, input interface 28 may include a receiver and/or a modem. Input interface 28 may be configured to receive encoded content over link 16. Display device 32 may be integrated with or may be external to destination device 14. In general, display device 32 may be configured to display decoded content. Display device 32 may comprise a variety of display devices, such as a liquid crystal display (LCD), a plasma display, an organic light emitting diode (OLED) display, or another type of display device.

Content encoder 20 and content decoder 30 each may be implemented as any of a variety of suitable circuitry, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. The term "processor" may be interchangeable with "processing unit." Each of content encoder 20 and content decoder 30 may be included in one or more encoders or decoders, either of which may be integrated as part of a combined encoder/decoder (CODEC) in a respective device.

In some examples, content encoder 20 and content decoder 30 may be configured to operate according to a content compression standard, such as DSC. Content encoder 20 may be configured to encode content (e.g., pixel data corresponding to content). In some examples, content may comprise one or more images. An image may be referred to as a "frame," particularly in examples where the content is a video with a plurality of images. The content encoder 20 may generate a bitstream. The bitstream may include a sequence of bits that form a coded representation of the content and associated data.

To generate the bitstream, content encoder 20 may be configured to perform encoding operations on pixel data. For example, when the content encoder 20 performs encoding operations on images, content encoder 20 may generate a series of coded images and associated data. The associated data may include a set of coding parameters such as a quantization parameter (QP). To generate a coded image, content encoder 20 may partition an image into blocks (e.g., coding blocks) and/or slices. A block may be a two-dimensional array of samples. In some examples, samples may refer to pixels; and, more specifically, values corresponding to one or more components of the pixels. In some examples, each block in a slice or in an image may have a block size of 8×2 samples (e.g., 2 rows of samples that are 8 samples long). In other examples, the block size may be different than 8×2. Content encoder 20 may be configured to partition one or more blocks into one or more sub-blocks. A sub-block may have a size smaller than the block with which it is associated. In examples where the block is 8×2, content encoder 20 may be configured to partition the block into four sub-blocks (e.g., four 2×2 sub-blocks or eight sub-blocks (e.g., eight 2×1 or 1×2 sub-blocks).

In some examples, the coding parameters may define a coding mode for one or blocks of samples. In some examples, the coding mode may be defined at the block level, at the slice level (e.g., every block in the slice may use the same coding mode), or at the image level (e.g., every block of the image may use the same coding mode). For example, content encoder 20 may be configured to select a coding mode at the block level, at the slice level, or at the image level. The coding mode may be selected (e.g., by content encoder 20) in order to achieve a desired rate-distortion performance. In some examples, available coding modes may include transform mode (e.g., discrete cosine transform (DCT) mode, Hadamard transform mode), block prediction mode, mid-point prediction (MPP) mode, and mid-point predication fall back (MPPF) mode.

In some examples, content encoder 20 may partition an image into a plurality of slices. Each of the slices may include a spatially distinct region in the image that may be independently encoded and/or decoded without information from other slices. In some examples, content encoder 20 may be configured to encode content such that, consistent with DSC, the target bits allocated to encode each slice may be substantially constant. As part of encoding the content, the content encoder 20 may perform encoding operations on each block and/or sub-block of an image. When the content encoder 20 performs an encoding operation on a slice, content encoder 20 may generate encoded data associated with the slice. The encoded data associated with the slice may be referred to as a "coded slice."

Figure 7:
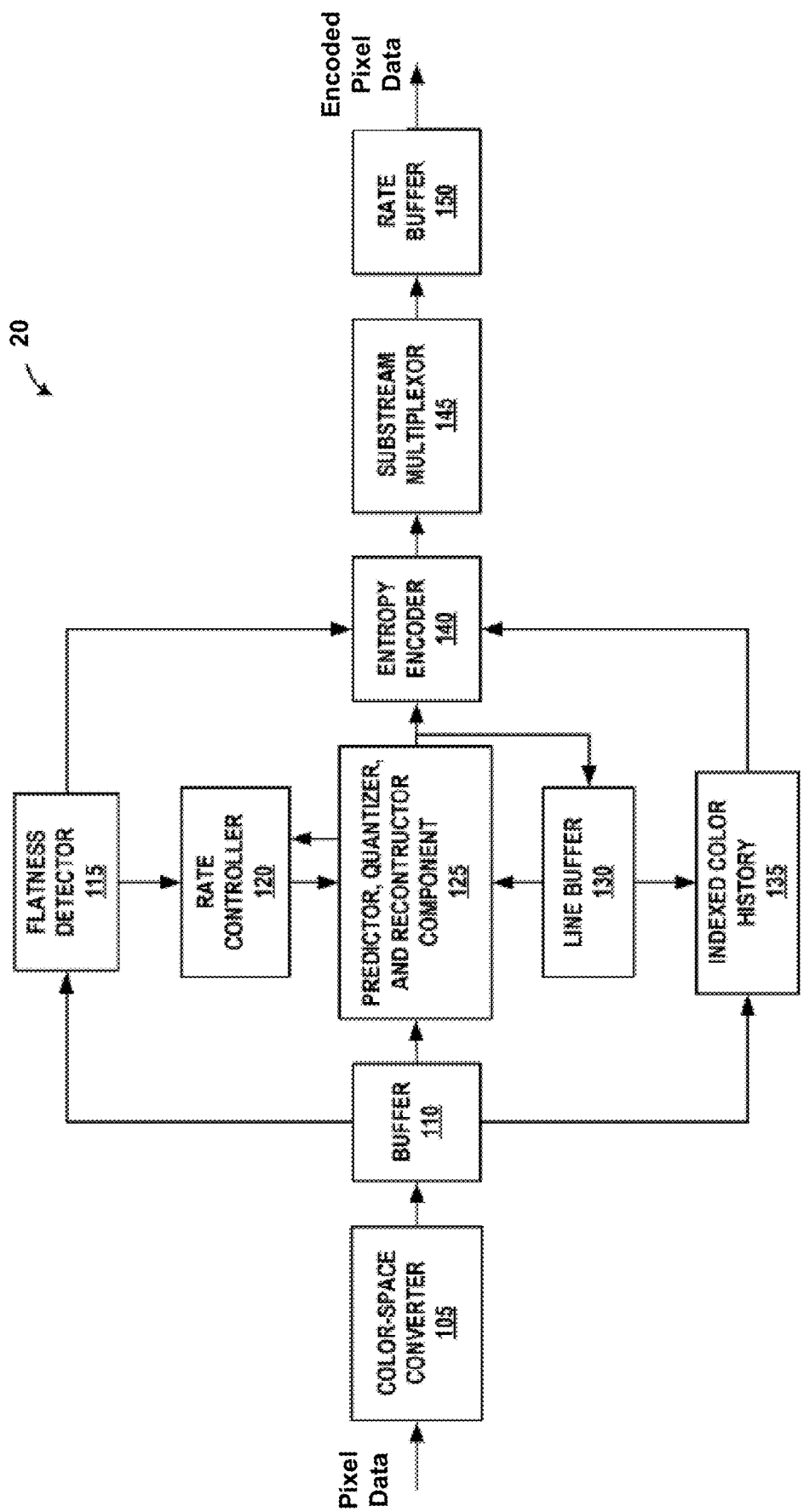
FIG. 7 is a block diagram illustrating an example of an image content encoder in accordance with the techniques of this disclosure.

FIG. 7 is a block diagram illustrating an example of the content encoder 20 that may implement techniques in accordance with aspects described in this disclosure. The content encoder 20 may be configured to perform some or all of the techniques of this disclosure. In some examples, the techniques described in this disclosure may be shared among the various components of the content encoder 20. In some examples, additionally or alternatively, a processor (not shown) may be configured to perform some or all of the techniques described in this disclosure.

For purposes of explanation, this disclosure may describe the content encoder 20 in the context of DSC coding. However, the techniques of this disclosure may be applicable to other coding standards or methods.

In the example of FIG. 7, the content encoder 20 may include a plurality of functional components. The functional components of the content encoder 20 may include a color-space converter 105, a buffer 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the content encoder 20 may include more, fewer, or different functional components.

The color-space converter 105 may convert an input color-space to the color-space used in the coding implementation. For example, in one example, the color-space of the input pixel data may be in the red, green, and blue (RGB) color-space and the coding may be implemented in the luminance Y, chrominance green Cg, and chrominance orange Co (YCoCg) color-space. The color-space conversion may be performed by method(s) including shifts and additions to the pixel data. It is noted that input pixel data in other color-spaces may be processed and conversions to other color-spaces may also be performed.

In related aspects, the content encoder 20 may include the buffer 110, the line buffer 130, and/or the rate buffer 150. For example, the buffer 110 may hold the color-space converted pixel data prior to its use by other portions of the content encoder 20. In another example, the pixel data may be stored in the RGB color-space and color-space conversion may be performed as needed, since the color-space converted data may require more bits.

The rate buffer 150 may function as part of the rate control mechanism in the content encoder 20, which will be described in greater detail below in connection with rate controller 120. The bits spent on encoding each block can vary highly substantially based on the nature of the block. The rate buffer 150 can smooth the rate variations in the compressed pixel data. In some examples, a constant bit rate (CBR) buffer model may be employed in which bits are taken out from the buffer at a constant bit rate. In the CBR buffer model, if the content encoder 20 adds too many bits to the bitstream, the rate buffer 150 may overflow. On the other hand, the content encoder 20 must add enough bits in order to prevent underflow of the rate buffer 150.

On the decoder side, the bits may be added to rate buffer 155 of the content decoder 30 (see FIG. 8 which is described in further detail below) at a constant bit rate, and the content decoder 30 may remove variable numbers of bits for each block. To ensure proper decoding, the rate buffer 155 of the content decoder 30 should not "underflow" or "overflow" during the decoding of the compressed bit stream.

In some examples, the buffer fullness (BF) may be defined based on the values BufferCurrentSize representing the number of bits currently in the buffer and BufferMaxSize representing the size of the rate buffer 150, i.e., the maximum number of bits that can be stored in the rate buffer 150 at any point in time. The BF may be calculated as: BF=((BufferCurrentSize*100)/BufferMaxSize). It is noted that this approach to calculating BF is merely exemplary, and that the BF may be calculated in any number of different ways, depending on the particular implementation or context.

The flatness detector 115 can detect changes from complex (i.e., non-flat) areas in the pixel data to flat (i.e., simple or uniform) areas in the pixel data, and/or vice versa. For example, a complex area (e.g., a complex coding block) may include high frequency components and have little or no spatial correlation between pixels. As another example, a flat area (e.g., a flat coding block) may include low frequency components and have high spatial correlation between pixels. The terms "complex" and "flat" may generally refer to the difficulty for the content encoder 20 to encode the respective regions of the pixel data. Thus, the term "complex" as used herein generally describes a region of the pixel data as being complex for the content encoder 20 to encode and may, for example, include textured pixel data, high spatial frequency, and/or other features which are complex to encode. The term "flat" as used herein generally describes a region of the pixel data as being simple for the content encoder 20 to encoder and may, for example, include a smooth gradient in the pixel data, low spatial frequency, and/or other features which are simple to encode. The transitions from complex to flat regions may be used by the content encoder 20 to reduce quantization artifacts in the encoded pixel data. Specifically, the rate controller 120 and the predictor, quantizer, and reconstructor component 125 can reduce such quantization artifacts when the transitions from complex to flat regions are identified. Similarly, transitions from flat to complex regions may be used by the content encoder 20 to increase the QP in order to reduce the expected rate required to code a current block.

The rate controller 120 determines a set of coding parameters, e.g., a QP. The QP may be adjusted by the rate controller 120 based on the buffer fullness of the rate buffer 150 and activity of the pixel data (e.g., a transition from complex to flat regions or vice versa) in order to maximize picture quality for a target bitrate which ensures that the rate buffer 150 does not overflow or underflow. The rate controller 120 also selects a particular coding option (e.g., a particular mode) for each block of the pixel data in order to achieve the optimal rate-distortion performance. The rate controller 120 minimizes the distortion of the reconstructed images such that it satisfies the bit-rate constraint, i.e., the overall actual coding rate fits within the target bit rate. Thus, one purpose of the rate controller 120 is to determine a set of coding parameters, such as QP value(s), coding mode(s), etc., to satisfy instantaneous and average constraints on rate while maximizing rate-distortion performance.

The predictor, quantizer, and reconstructor component 125 may perform at least three encoding operations of the content encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values.

Another example prediction mode is block prediction. In block prediction, samples are predicted from previously reconstructed pixels in the line above or to the left in the same line. In some examples, the content encoder 20 and the content decoder 30 may both perform an identical search on reconstructed pixels to determine the block prediction usages, and thus, no bits need to be sent in the block prediction mode. In other examples, the content encoder 20 may perform the search and signal block prediction vectors in the bitstream, such that the content decoder 30 need not perform a separate search. A midpoint prediction mode may also be implemented in which samples are predicted using the midpoint of the component range. The midpoint prediction mode may enable bounding of the number of bits required for the compressed pixel data in even the worst-case sample.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered pixel data. The indexed color history 135 stores recently used pixel values. These recently used pixel values can be referenced directly by the content encoder 20 via a dedicated syntax.

The entropy encoder 140 encodes the residual data (e.g., prediction residuals) and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the content decoder 30 to run three entropy decoders in parallel, facilitating the decoding of three pixels per clock. The substream multiplexor 145 may optimize the packet order so that the packets can be efficiently decoded by the content decoder 30. It is noted that different approaches to entropy coding may be implemented, which may facilitate the decoding of power-of-2 pixels per clock (e.g., 2 pixels/clock or 4 pixels/clock).

Figure 8:
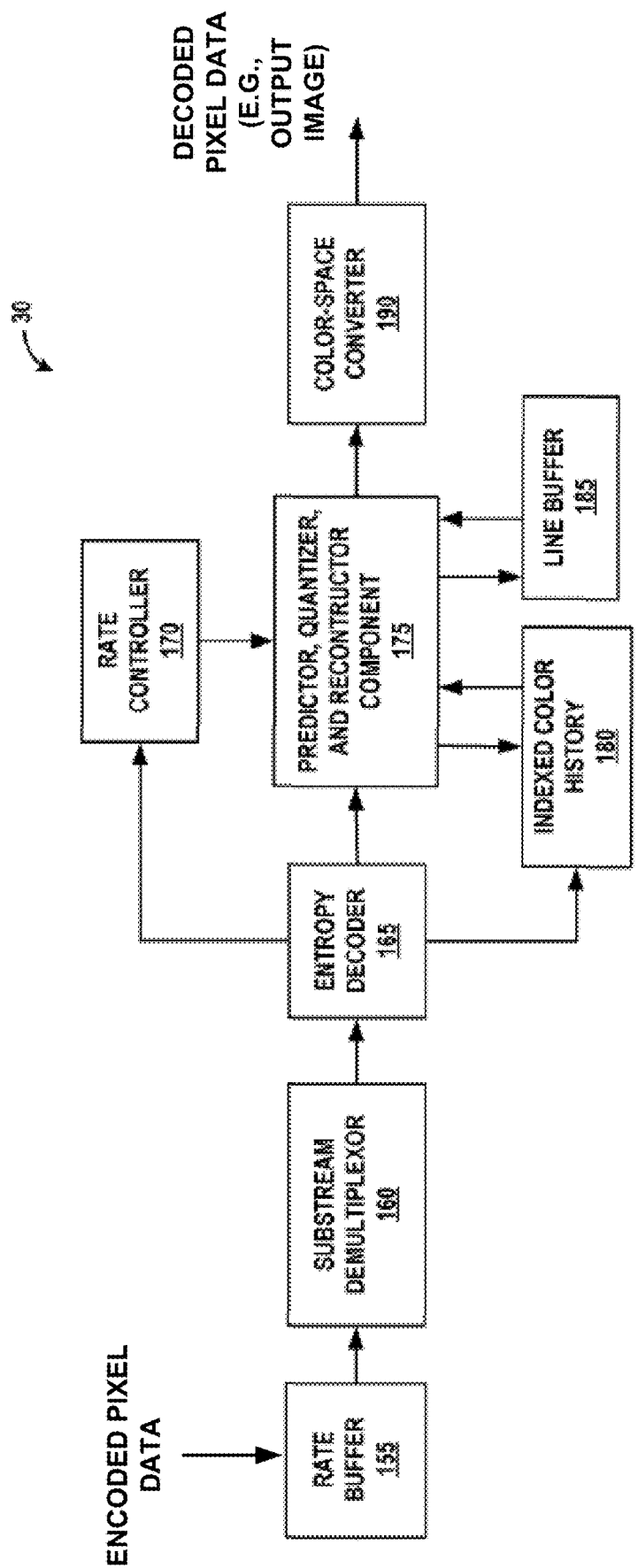
FIG. 8 is a block diagram illustrating an example of an image content decoder in accordance with the techniques of this disclosure.

FIG. 8 is a block diagram illustrating an example of the content decoder 30 that may implement techniques in accordance with aspects described in this disclosure. The content decoder 30 may be configured to perform some or all of the techniques of this disclosure. In some examples, the techniques described in this disclosure may be shared among the various components of the content decoder 30. In some examples, additionally or alternatively, a processor (not shown) may be configured to perform some or all of the techniques described in this disclosure. In some examples, content decoder 30 may be unaware of whether encoded data was encoded using the error diffusion techniques (e.g., MPP+ED (full), MPP+ED (light), MPPF+ED (full), or MPPF+ED (light)) described herein. In some examples, content decoder 30 may not be configured to perform the error diffusion techniques described herein.

For purposes of explanation, this disclosure describes the content decoder 30 in the context of DSC coding. However, the techniques of this disclosure may be applicable to other coding standards or methods.

In the example of FIG. 8, the content decoder 30 includes a plurality of functional components. The functional components of the content decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the content decoder 30 are analogous to the corresponding components described above in connection with the content encoder 20 in FIG. 7. As such, each of the components of the content decoder 30 may operate in a similar fashion to the corresponding components of the content encoder 20 as described above. Content decoder 30 may output decoded pixel data (e.g., an output image) that may be displayed by display device 32.

Figure 9:
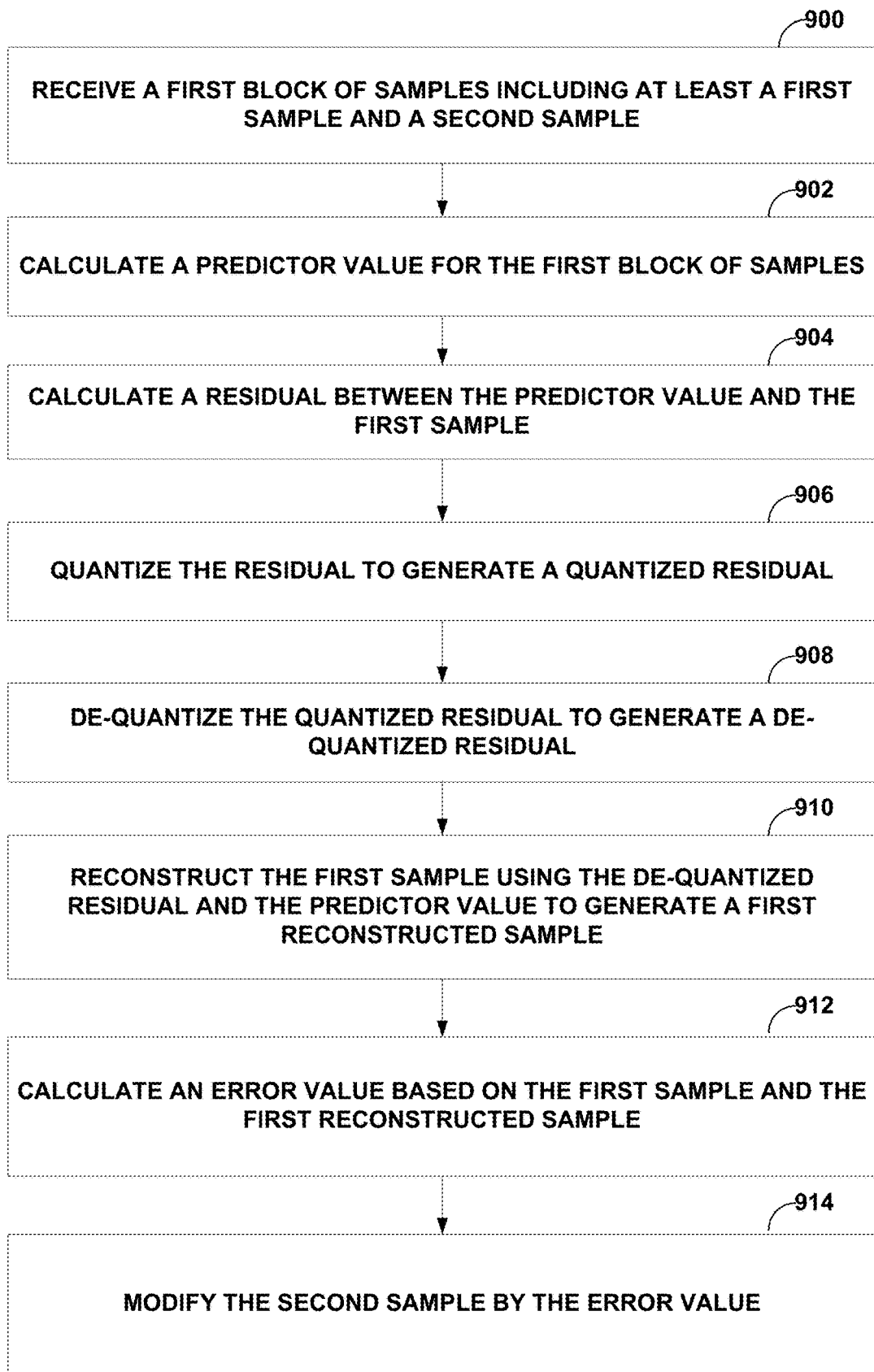
FIG. 9 is a flowchart illustrating an example method of the disclosure.

FIG. 9, is a flowchart illustrating an example method of the disclosure. The techniques of FIG. 9 may be implemented by processing unit 1 of FIGS. 1A-1C. In some examples, processing unit 1 may be configured as content encoder 20 of FIG. 6.

In one example of the disclosure, processing unit 1 may be configured to receive a first block of samples including at least a first sample and a second sample (900). Processing unit 1 may be further configured to calculate a predictor value for the first block of samples (902) and calculate a residual between the predictor value and the first sample (904). Processing unit 1 may then quantize the residual to generate a quantized residual (906).

In order to determine the value of the first sample after decoding, processing unit 1 may de-quantize the quantized residual to generate a de-quantized residual (908) and reconstruct the first sample using the de-quantized residual and the predictor value to generate a first reconstructed sample (910). Processing unit 1 may further calculate an error value based on the first sample and the first reconstructed sample (912) and modify the second sample by the error value (914).

The techniques of FIG. 9 relate to diffusing quantization error into at least one other sample of a block of samples. Of course, consistent with the examples described above, error may be diffused into two more samples of a block, including all samples of a block of any size.

Figure 10A:
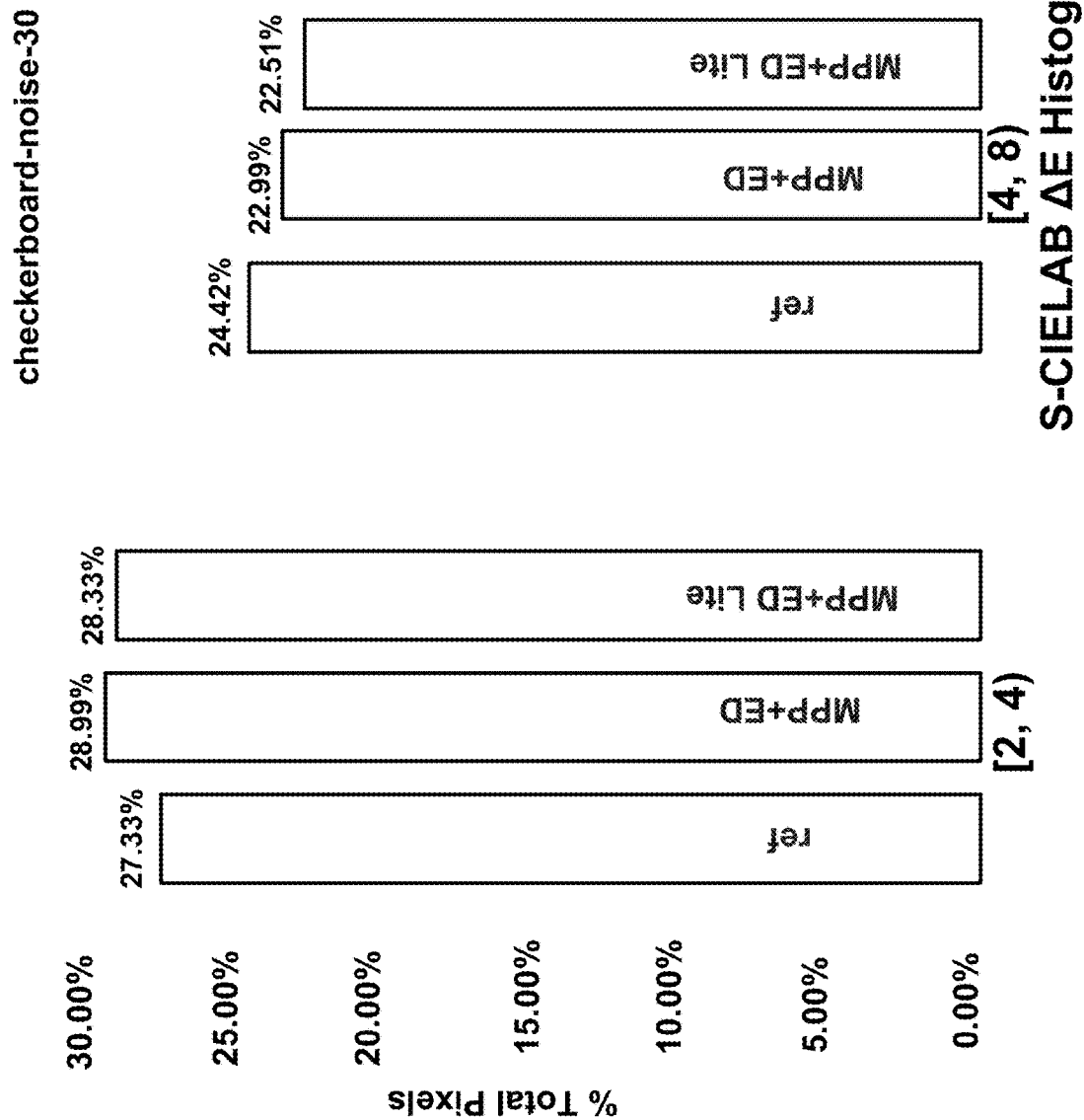
FIGS. 10A-10B illustrate test results for test images using the techniques described herein.
Figure 10B:
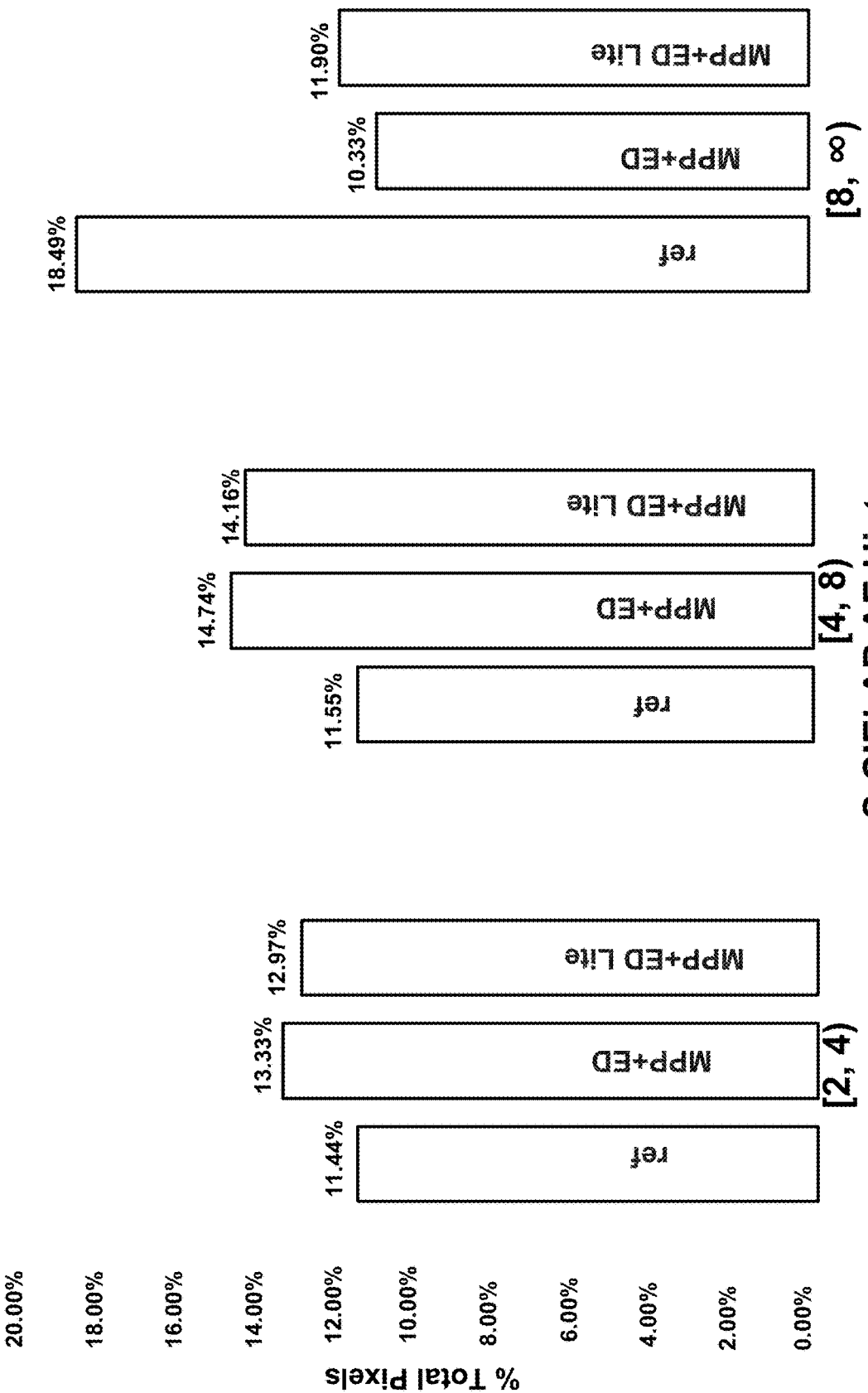

FIGS. 10A-10B illustrate test results for test images using the techniques described herein. For example, the test results shown in FIGS. 10A and 10B show the S-CIELAB delta-E color error associated with the reconstructed random noise test images, binned into 4 bins (three of which are shown). The most important bin to analyze is delta-E in [8, ∞), since any pixel with a delta-E value above 8 may be perceived as an artifact in the reconstructed image. As shown in FIGS. 10A-10B, the delta-E color error is significantly reduced when using the error diffusion techniques of this disclosure (MPP+ED or MPP+ED Lite).

In addition to the objective results shown in FIGS. 10A-10B, the error diffusion techniques described herein have been analyzed subjectively using a scrolling test paradigm. The scrolling test is generated using the following steps for a given source image:
1. Generate N copies of the source image, where each is shifted by an increasing number of pixels. That is, frame 0 is the source image, frame 1 is shifted by 1x, frame 2 by 2px, . . . , etc.
2. Compress and reconstruct each of the N source images, keeping the reconstructed images only.
3. Play back the sequence of reconstructed images at a given frame rate (e.g. 30 Hz or 60 Hz)

The scrolling test confirms that the proposed error diffusion technique increases the visual quality of random noise sequences.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, it is understood that such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of content compression, the method comprising:
receiving a first block of samples including at least a first sample, a second sample, and a third sample;
calculating a predictor value for the first block of samples;
calculating a residual between the predictor value and the first sample;
quantizing the residual to generate a quantized residual;
de-quantizing the quantized residual to generate a de-quantized residual;
reconstructing the first sample using the de-quantized residual and the predictor value to generate a first reconstructed sample;
calculating an error value based on a difference between the first sample and the first reconstructed sample;
modifying the second sample by the error value;
modifying the third sample by the error value;
calculating a second residual between the predictor value and the modified second sample;
quantizing the second residual to generate a second quantized residual;
de-quantizing the second quantized residual to generate a second de-quantized residual;
reconstructing the modified second sample using the second de-quantized residual and the predictor value to generate a second reconstructed sample;
calculating a second error value based on a difference between the modified second sample and the second reconstructed sample; and
modifying the modified third sample by the second error value.

2. The method of claim 1, wherein the predictor value is a midpoint predictor.

3. The method of claim 1, further comprising:
calculating the predictor value for the first block samples in accordance with a midpoint prediction mode or a midpoint prediction fallback mode.

4. The method of claim 1, further comprising:
outputting the quantized residual in a bitstream.

5. The method of claim 1, further comprising:
outputting the second quantized residual in the bitstream.

6. The method of claim 1, further comprising:
calculating a third residual between the predictor value and the twice-modified third sample; and
quantizing the third residual to generate a third quantized residual.

7. The method of claim 6, further comprising:
outputting the third quantized residual in the bitstream.

8. The method of claim 7, further comprising:
de-quantizing the third quantized residual to generate a third de-quantized residual;
reconstructing the twice-modified third sample using the third de-quantized residual and the predictor value to generate a third reconstructed sample; and
calculating a third error value based on the twice-modified third sample and the third reconstructed sample.

9. The method of claim 8, wherein the first block of samples includes a fourth sample, the method further comprising:
modifying the fourth sample by the second error value; and
modifying the modified fourth sample by the third error value.

10. A device comprising:
a memory configured to store content; and
one or more processors in communication with the memory, wherein the one or more processors are configured to:
receive a first block of samples including at least a first sample, a second sample, and a third sample;
calculate a predictor value for the first block of samples;
calculate a residual between the predictor value and the first sample;
quantize the residual to generate a quantized residual;
de-quantize the quantized residual to generate a de-quantized residual;
reconstruct the first sample using the de-quantized residual and the predictor value to generate a first reconstructed sample;
calculate an error value based on a difference between the first sample and the first reconstructed sample;
modify the second sample by the error value;
modify the third sample by the error value;
calculate a second residual between the predictor value and the modified second sample;
quantize the second residual to generate a second quantized residual;
de-quantize the second quantized residual to generate a second de-quantized residual;
reconstruct the modified second sample using the second de-quantized residual and the predictor value to generate a second reconstructed sample;
calculate a second error value based on a difference between the modified second sample and the second reconstructed sample; and
modify the modified third sample by the second error value.

11. The device of claim 10, wherein the predictor value is a midpoint predictor.

12. The device of claim 10, wherein the one or more processors are further configured to:
calculate the predictor value for the first block samples in accordance with a midpoint prediction mode or a midpoint prediction fallback mode.

13. The device of claim 10, wherein the one or more processors are further configured to:
output the quantized residual in a bitstream.

14. The device of claim 10, wherein the one or more processors are further configured to:
output the second quantized residual in the bitstream.

15. The device of claim 10, wherein the one or more processors are further configured to:
calculate a third residual between the predictor value and the twice-modified third sample; and
quantize the third residual to generate a third quantized residual.

16. The device of claim 15, wherein the one or more processors are further configured to:
output the third quantized residual in the bitstream.

17. The device of claim 16, wherein the one or more processors are further configured to:
de-quantize the third quantized residual to generate a third de-quantized residual;
reconstruct the twice-modified third sample using the third de-quantized residual and the predictor value to generate a third reconstructed sample; and
calculate a third error value based on the twice-modified third sample and the third reconstructed sample.

18. The device of claim 17, wherein the first block of samples includes a fourth sample, and wherein the one or more processors are further configured to:
modify the fourth sample by the second error value; and
modify the modified fourth sample by the third error value.

19. The device of claim 10, further comprising a display configured to display decoded content.

20. The device of claim 10, wherein the device comprises one or more of a camera, a computer, a mobile device, a broadcast receiver device, or a set-top box.

21. An apparatus comprising:
means for receiving a first block of samples including at least a first sample, a second sample, and a third sample;
means for calculating a predictor value for the first block of samples;
means for calculating a residual between the predictor value and the first sample;
means for quantizing the residual to generate a quantized residual;
means for de-quantizing the quantized residual to generate a de-quantized residual;
means for reconstructing the first sample using the de-quantized residual and the predictor value to generate a first reconstructed sample;
means for calculating an error value based on a difference between the first sample and the first reconstructed sample;
means for modifying the second sample by the error value;
means for modifying the third sample by the error value;
means for calculating a second residual between the predictor value and the modified second sample;
means for quantizing the second residual to generate a second quantized residual;
means for de-quantizing the second quantized residual to generate a second de-quantized residual;
means for reconstructing the modified second sample using the second de-quantized residual and the predictor value to generate a second reconstructed sample;
means for calculating a second error value based on a difference between the modified second sample and the second reconstructed sample; and
means for modifying the modified third sample by the second error value.

22. The apparatus of claim 21, wherein the predictor value is a midpoint predictor.

23. The apparatus of claim 21, further comprising:
means for calculating the predictor value for the first block samples in accordance with a midpoint prediction mode or a midpoint prediction fallback mode.

24. The apparatus of claim 21, further comprising:
means for outputting the quantized residual in a bitstream.

25. The apparatus of claim 21, further comprising:
means for outputting the second quantized residual in the bitstream.

26. The apparatus of claim 21, further comprising:
means for calculating a third residual between the predictor value and the twice-modified third sample; and
means for quantizing the third residual to generate a third quantized residual.

27. The apparatus of claim 26, further comprising:
means for outputting the third quantized residual in the bitstream.

28. The apparatus of claim 27, further comprising:
means for de-quantizing the third quantized residual to generate a third de-quantized residual;
means for reconstructing the twice-modified third sample using the third de-quantized residual and the predictor value to generate a third reconstructed sample; and
means for calculating a third error value based on the twice-modified third sample and the third reconstructed sample.

29. The apparatus of claim 28, wherein the first block of samples includes a fourth sample, the apparatus further comprising:
means for modifying the fourth sample by the second error value; and
means for modifying the modified fourth sample by the third error value.

30. A non-transitory computer-readable storage medium storing instructions that, when executed, cause one or more processors to:
receive a first block of samples including at least a first sample, a second sample, and a third sample;
calculate a predictor value for the first block of samples;
calculate a residual between the predictor value and the first sample;
quantize the residual to generate a quantized residual;
de-quantize the quantized residual to generate a de-quantized residual;
reconstruct the first sample using the de-quantized residual and the predictor value to generate a first reconstructed sample;
calculate an error value based on a difference between the first sample and the first reconstructed sample;
modify the second sample by the error value;
modify the third sample by the error value;
calculate a second residual between the predictor value and the modified second sample;
quantize the second residual to generate a second quantized residual;
de-quantize the second quantized residual to generate a second de-quantized residual;
reconstruct the modified second sample using the second de-quantized residual and the predictor value to generate a second reconstructed sample;
calculate a second error value based on a difference between the modified second sample and the second reconstructed sample; and
modify the modified third sample by the second error value.

31. The non-transitory computer-readable storage medium of claim 30, wherein the predictor value is a midpoint predictor.

32. The non-transitory computer-readable storage medium of claim 30, wherein the instructions further cause the one or more processors to:
calculate the predictor value for the first block samples in accordance with a midpoint prediction mode or a midpoint prediction fallback mode.

33. The non-transitory computer-readable storage medium of claim 30, wherein the instructions further cause the one or more processors to:
output the quantized residual in a bitstream.

34. The non-transitory computer-readable storage medium of claim 30, wherein the instructions further cause the one or more processors to:
output the second quantized residual in the bitstream.

35. The non-transitory computer-readable storage medium of claim 30, wherein the instructions further cause the one or more processors to:
calculate a third residual between the predictor value and the twice-modified third sample; and
quantize the third residual to generate a third quantized residual.

36. The non-transitory computer-readable storage medium of claim 35, wherein the instructions further cause the one or more processors to:
output the third quantized residual in the bitstream.

37. The non-transitory computer-readable storage medium of claim 36, wherein the instructions further cause the one or more processors to:
de-quantize the third quantized residual to generate a third de-quantized residual;
reconstruct the twice-modified third sample using the third de-quantized residual and the predictor value to generate a third reconstructed sample; and
calculate a third error value based on the twice-modified third sample and the third reconstructed sample.

38. The non-transitory computer-readable storage medium of claim 37, wherein the first block of samples includes a fourth sample, and wherein the instructions further cause the one or more processors to:
modify the fourth sample by the second error value; and
modify the modified fourth sample by the third error value.

* * * * *